(12) United States Patent
Tarao et al.

(10) Patent No.: US 9,028,343 B2
(45) Date of Patent: May 12, 2015

(54) GOLF BALL

(75) Inventors: Toshiyuki Tarao, Kobe (JP); Kazuyoshi Shiga, Kobe (JP); Chiemi Mikura, Kobe (JP); Kazuhisa Fushihara, Kobe (JP)

(73) Assignee: Dunlop Sports Co., Ltd., Kobe, Hyogo ( * ) Notice: Subject to any disclaimer, the term of this patent is extended or adjusted under 35 U.S.C. 154(b) by 164 days.

(21) Appl. No.: 13/599,441

(22) Filed: Aug. 30, 2012

(65) Prior Publication Data

US 2013/0053182 A1    Feb. 28, 2013

(30) Foreign Application Priority Data

Aug. 31, 2011    (JP) .................................. 2011-189296

(51) Int. Cl.
| A63B 37/12 | (2006.01) |
| A63B 37/14 | (2006.01) |
| A63B 37/00 | (2006.01) |
| B29C 43/14 | (2006.01) |
| C08K 5/098 | (2006.01) |

(52) U.S. Cl.
CPC ......... *A63B 37/0022* (2013.01); *A63B 37/0037* (2013.01); *A63B 37/0063* (2013.01); *A63B 37/0096* (2013.01); *A63B 37/0003* (2013.01); *A63B 37/0033* (2013.01); *A63B 37/0061* (2013.01); *A63B 37/0062* (2013.01); *A63B 37/0064* (2013.01); *A63B 37/0065* (2013.01); *B29C 43/146* (2013.01); *A63B 37/0051* (2013.01); *C08K 5/098* (2013.01)

(58) Field of Classification Search
USPC .......................... 473/351, 371–374, 376–378
See application file for complete search history.

(56) References Cited

U.S. PATENT DOCUMENTS

| 4,726,590 | A | * | 2/1988 | Molitor ......................... 473/372 |
| 4,852,884 | A | * | 8/1989 | Sullivan ........................ 473/372 |
| 5,184,828 | A | * | 2/1993 | Kim et al. ..................... 473/374 |
| 5,816,944 | A | * | 10/1998 | Asakura et al. ............... 473/372 |
| 2001/0034412 | A1 | * | 10/2001 | Nesbitt ........................ 525/193 |
| 2002/0052254 | A1 | * | 5/2002 | Ichikawa et al. .............. 473/378 |
| 2006/0019771 | A1 | * | 1/2006 | Kennedy et al. .............. 473/351 |
| 2006/0025238 | A1 | * | 2/2006 | Endo et al. ................... 473/371 |
| 2006/0128900 | A1 | * | 6/2006 | Nanba et al. .................. 525/261 |
| 2008/0161134 | A1 | * | 7/2008 | Tarao ........................... 473/378 |

(Continued)

FOREIGN PATENT DOCUMENTS

| JP | 2006-34740 A | 2/2006 |
| JP | 2009-131508 A | 6/2009 |
| WO | WO 2009/051114 A1 | 4/2009 |

*Primary Examiner* — Alvin Hunter
*Assistant Examiner* — John E Simms, Jr.
(74) *Attorney, Agent, or Firm* — Birch, Stewart, Kolasch & Birch, LLP

(57) ABSTRACT

The present invention provides a golf ball comprising a spherical core and at least one cover layer covering the spherical core, wherein the cover is formed from a polyurethane composition containing a polyurethane elastomer as a resin component, the polyurethane composition satisfying properties of rebound resilience of 54% or more and a shear loss modulus G" of $5.03 \times 10^6$ Pa or less when measured in a shear mode using a dynamic viscoelasticity measuring apparatus at the conditions of the temperature of 0° C., and the oscillation frequency of 10 Hz, and the spherical core has a hardness distribution that $R^2$ of a linear approximate curve determined by a least-squares method is 0.95 or more, when plotting JIS-C hardness measured at a center, a surface and at intervals of 2.5 mm from the center of the spherical core, versus distances from the center of the spherical core.

11 Claims, 11 Drawing Sheets

(56) References Cited

U.S. PATENT DOCUMENTS

| | | | |
|---|---|---|---|
| 2008/0194357 A1* | 8/2008 | Higuchi | 473/373 |
| 2009/0105013 A1* | 4/2009 | Slagel et al. | 473/378 |
| 2009/0143169 A1* | 6/2009 | Shiga et al. | 473/378 |
| 2010/0137076 A1 | 6/2010 | Endo et al. | |
| 2010/0216905 A1 | 8/2010 | Kuwamura et al. | |
| 2010/0298067 A1* | 11/2010 | Watanabe | 473/373 |

\* cited by examiner stop the golf ball, the spin rate on middle or long iron shots
GOLF BALL

FIELD OF THE INVENTION

The present invention relates to improvements of controllability on approach shots and flight distance on middle or long iron shots of a golf ball.

DESCRIPTION OF THE RELATED ART

Since 2010, a new groove regulation has entered in force in a professional golf world on clubs having a loft angle of 25° or more such as irons or wedges. This new regulation will be gradually applied to amateur golfers. Since this regulation reduces the spin rate on approach shots with short irons or wedges, it becomes difficult to stop the golf ball on the green. Based on this background, golf balls that have a higher spin rate and stop readily on the green are required.

In order to stop a golf ball on the green on approach shots, for example, soft cover materials are used to increase a spin rate on approach shots (Japanese Patent Publication No. 2006-034740). Further, the inventors of the present invention have filed a Japanese patent application (published as Japanese Patent Publication No. 2009-131508) where the spin rate is increased by regulating the steric structure of the polyurethane which is a resin component of the cover. International Patent Publication No. WO2009/051114 discloses a novel polyurethane material.

SUMMARY OF THE INVENTION

One of the highest requirements for golf balls is a great flight distance. Although there are many proposals of golf ball traveling a great flight distance on driver shots, the golf balls traveling a great distance on middle or long iron shots have hardly been studied. The golf balls traveling a great flight distance on driver shots do not always travel a great distance on middle or long iron shots. Especially, not a few golfers are bad at long irons shots, and the clubs like hybrid clubs and fairway woods that are easy to provide a long distance are used in place of long irons.

If the spin rate on approach shots is increased in order to stop the golf ball, the spin rate on middle or long iron shots also increases. As a result, the flight distance on middle or long iron shots becomes short. The present invention has been made in view of the above circumstances. An object of the present invention is to provide a golf ball traveling a great distance on middle or long iron shots and having an excellent controllability with a high spin rate on approach shots.

The present invention that has solved the above problem provides a golf ball comprising a spherical core and at least one cover layer covering the spherical core, wherein the cover is formed from a polyurethane composition containing a polyurethane elastomer as a resin component, the polyurethane composition satisfying properties of rebound resilience of 54% or more and a shear loss modulus G" of $5.03\times10^6$ Pa or less when measured in a shear mode using a dynamic viscoelasticity measuring apparatus at the conditions of the temperature of 0° C., and the oscillation frequency of 10 Hz, and the spherical core has a hardness distribution that $R^2$ of a linear approximate curve determined by a least-squares method is 0.95 or more, when plotting JIS-C hardness measured at a center, a surface and at intervals of 2.5 mm from the center of the spherical core, versus distances from the center of the spherical core.

The polyurethane composition used in the present invention has higher rebound resilience for hardness thereof than the conventional polyurethane material. Thus, if the polyurethane composition used in the present invention is used as a material constituting the cover, it is possible to strike a balance between the controllability and flight distance.

With respect to the deformation of the cover when hitting the golf ball, it is considered that the shear deformation is dominant on approach shots. Based on this hypothesis, the inventors of the present invention have studied characteristics of the polyurethane material, and found that the spin rate on approach shots correlates with the shear loss modulus G" measured in a shear mode at the conditions of a temperature of 0° C. and oscillation frequency of 10 Hz using a dynamic viscoelasticity measuring apparatus. In the present invention, use of the polyurethane composition having a shear loss modulus G" of $5.03\times10^6$ Pa or less provides a golf ball with a high spin rate on approach shots. Concurrently, use of the polyurethane composition having rebound resilience of 54% or more improves the resilience of the golf ball, resulting in a greater flight distance.

In the present invention, the polyurethane composition having a shear loss modulus G" of $1.06\times10^6$ Pa or less is preferably used. In the present invention, the reason why the viscoelasticity is measured at the conditions of the temperature of 0° C. and oscillation frequency of 10 Hz is as follows. The contact time between the golf ball and the golf club when hitting the golf ball is several hundreds micro seconds. If this impact is considered as one deformation, this deformation corresponds to the deformation at the frequency of several thousands Hertz. Based on the time-temperature superposition principle of the general polyurethane elastomer, the viscoelasticity measured at the conditions of temperature: room temperature and oscillation frequency: several thousands Hertz correspond to the viscoelasticity measured at the conditions of temperature: 0° C. and oscillation frequency: 10 Hz.

The spherical core used in the present invention has a hardness distribution that $R^2$ of a linear approximate curve determined by a least-squares method is 0.95 or more, when plotting JIS-C hardness measured at a center, a surface and at intervals of 2.5 mm from the center of the spherical core, versus distances from the center of the spherical core. Use of the spherical core having hardness distribution where the hardness increases linearly or almost linearly from the center of the core toward the surface thereof reduces the spin rate on middle or long iron shots, thereby providing a greater flight distance on middle or long iron shots.

According to the present invention, it is possible to provide a golf ball traveling a great distance on middle or long iron shots and having a high spin rate on approach shots.

DESCRIPTION OF THE PREFERRED EMBODIMENT

The present invention provides a golf ball comprising a spherical core and at least one cover layer covering the spherical core, wherein the cover is formed from a polyurethane composition containing a polyurethane elastomer as a resin component, the polyurethane composition satisfying properties of rebound resilience of 54% or more and a shear loss modulus G" of $5.03 \times 10^6$ Pa or less when measured in a shear mode using a dynamic viscoelasticity measuring apparatus at the conditions of the temperature of 0° C., and the oscillation frequency of 10 Hz, and the spherical core has a hardness distribution that $R^2$ of a linear approximate curve determined by a least-squares method is 0.95 or more, when plotting JIS-C hardness measured at a center, a surface and at intervals of 2.5 mm from the center of the spherical core, versus distances from the center of the spherical core.

Figure 1:
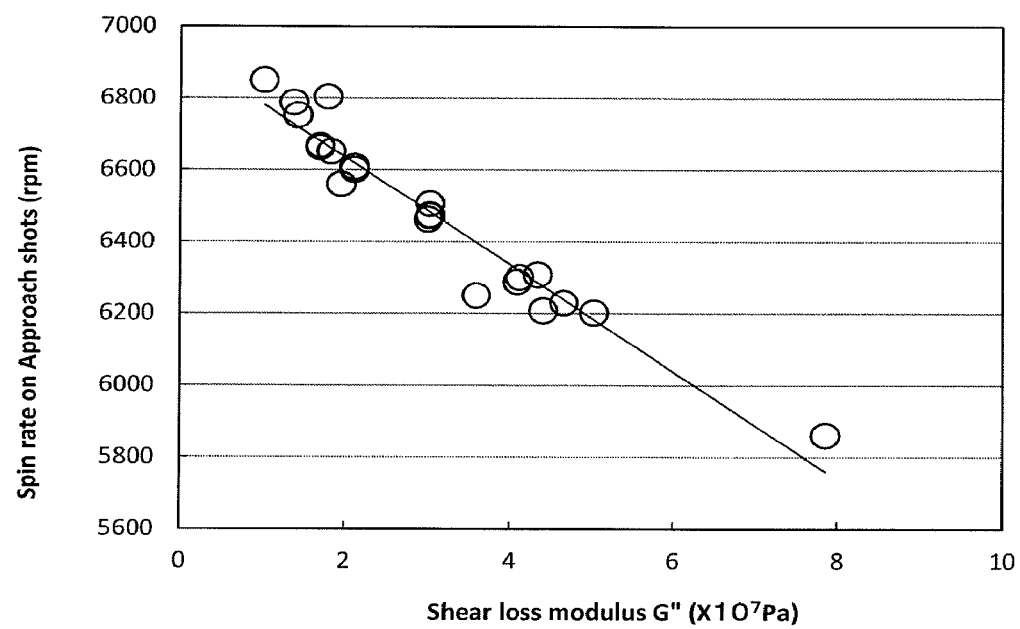
FIG. 1 is a graph showing a correlation between the spin rate on approach shots and the shear loss modulus G"

First, the polyurethane composition used in the present invention will be explained. The polyurethane composition for use in the present invention has a shear loss modulus G" of $5.03 \times 10^6$ Pa or less when measured at the conditions of the temperature of 0° C., the oscillation frequency of 10 Hz, and in a shear mode using a dynamic viscoelasticity measuring apparatus. FIG. 1 shows a correlation between the spin rate on approach shots and the shear loss modulus G" in a golf ball using $H_{12}$MDI-PTMG polyurethane elastomer for a cover disclosed in Japanese Patent Publication No. 2011-125438 previously filed by the inventors of the present invention. FIG. 1 shows a good correlation between the spin rate on approach shots and the shear loss modulus G". The spin rate on approach shots increase as the shear loss modulus G" is getting small. In the present invention, use of the polyurethane composition having a shear loss modulus G" of $5.03 \times 10^6$ Pa or less increase the spin rate on approach shots. The shear loss modulus G" is preferably $1.60 \times 10^6$ Pa or less, more preferably $1.00 \times 10^6$ Pa or less. The lower limit of the shear loss modulus G" is not specifically restricted, but is preferably $0.1 \times 10^6$ Pa, more preferably $0.15 \times 10^6$ Pa, even more preferably $0.2 \times 10^6$ Pa. If the shear loss modulus G" is $0.1 \times 10^6$ Pa or more, the handling of the polyurethane composition becomes better in a production process.

The polyurethane composition for use in the present invention preferably has rebound resilience of 54% or more, more preferably 56% or more, even more preferably 58% or more. If the rebound resilience is 54% or more, since the obtained golf ball has improved resilience, the resultant golf ball travels a great distance. On the other hand, the rebound resilience is as good as higher. The upper limit of the rebound resilience is not specifically limited, and is preferably 70%, more preferably 85%, even more preferably 100%.

The polyurethane composition for use in the present invention is not limited, as long as the polyurethane composition contains a polyurethane elastomer as a resin component, and satisfies the above properties. The polyurethane elastomer is a reaction product of a polyisocyanate component and a polyol component and is an elastomer having plurality of urethane bonds in a molecular chain. If necessary, a polyamine component may be allowed to react. The polyurethane elastomer may be one kind of the polyurethane elastomer or a mixture of two or more kinds of them.

The polyurethane elastomer preferably contains 1,4-bis(isocyanatomethyl)cyclohexane as a polyisocyanate component. It is preferable that the polyisocyanate component essentially consists of 1,4-bis(isocyanatomethyl)cyclohexane, but other polyisocyanates may be used in combination, to the extent that the effect of the present invention does not deteriorate. In the case of using other polyisocyanates in combination, the content of 1,4-bis(isocyanatomethyl)cyclohexane in the polyisocyanate component is preferably 50 mole % or more, more preferably 70 mole % or more, even more preferably 80 mole % or more, in a molar ratio of isocyanate groups of 1,4-bis(isocyanatomethyl)cyclohexane to all isocyanate groups of the polyisocyanate components.

1,4-bis(isocyanatomethyl)cyclohexane includes configurational isomers of a trans-isomer and a cis-isomer. In the present invention, 1,4-bis(isocyanatomethyl)cyclohexane containing the trans-isomer in a ratio of 80 mole % or more is preferably used. If 1,4-bis(isocyanatomethyl)cyclohexane containing the trans-isomer in a ratio of 80 mole % or more is used, it is possible to strike a balance between resilience and spin rate at a higher level. From this aspect, the ratio of the trans-isomer is preferably 82 mole % or more, and more preferably 85 mole % or more. The ratio of trans-isomer in 1,4-bis(isocyanatomethyl)cyclohexane can be measured, for example, by $^{13}$C-NMR (JOEL α-400 NMR 100 MHz available from JOEL Ltd.). Solvents for preparing samples include deuterated solvents such as chloroform, methanol, dimethyl sulfoxide, preferably includes deuterated chloroform. The measuring temperature ranges from 20° C. to 80° C., and is preferably 23° C.

The polyisocyanate component that can be used with 1,4-bis(isocyanatomethyl)cyclohexane is not limited, as long as it has at least two isocyanate groups. Examples of the polyisocyanate component include an aromatic polyisocyanate such as 2,4-tolylene diisocyanate, 2,6-tolylene diisocyanate, a mixture of 2,4-tolylene diisocyanate and 2,6-tolylene diisocyanate (TDI), 4,4'-diphenylmethane diisocyanate (MDI), 1,5-naphthylene diisocyanate (NDI), 3,3'-bitolylene-4,4'-diisocyanate (TODI, xylylene diisocyanate (XDI), tetramethylxylylenediisocyanate (TMXDI), para-phenylene diisocyanate (PPDI); an alicyclic polyisocyanate or aliphatic polyisocyanate such as 4,4'-dicyclohexyl methane diisocyanate ($H_{12}$MDI), 1,3-di(isocyanatomethyl)cyclohexane, hexamethylene diisocyanate (HDI), isophorone diisocyanate (IPDI), and norbornene diisocyanate (NBDI). These may be used either alone or as a mixture of at least two of them.

As a polyol component constituting the polyurethane elastomer for use in the present invention, preferably used is a polyol having a number average molecular weight ranging from 200 to 6,000. The polyol having a number average molecular weight ranging from 200 to 6,000 forms a soft segment and imparts the softness to the polyurethane. The number average molecular weight of the polyol component is preferably 250 or more, more preferably 300 or more, and even more preferably 1,500 or more. If the number average molecular weight of the polyol component is too small, the obtained polyurethane may become too hard. If the number average molecular weight of the polyol component is 6,000 or less, it is possible to provide a golf ball with a less spin rate on driver shots. From this aspect, the number average molecular weight of the polyol component is more preferably 4,000 or less, even more preferably 3,000 or less.

The number average molecular weight of the polyol component can be measured by Gel permeation Chromatography using two columns of TSK-GEL SUPREH 2500 (TOSOH Corporation) as a column, polystyrene as a standard material, and tetrahydrofuran as an eluate.

The polyol component having a number average molecular weight from 200 to 6,000 is preferably a polymer polyol. The polymer polyol is a polymer obtained by polymerizing a low molecular compound, and has plurality of hydroxyl groups. Among them, a polymer diol having two hydroxyl groups is more preferable. Use of the polymer diol provides a linear thermoplastic polyurethane and facilitates the molding of the obtained polyurethane into the constituting member of the golf ball.

Examples of the polymer polyol having a number average molecular weight from 200 to 6,000 include a polyether polyol such as polyoxyethylene glycol (PEG), polyoxypropylene glycol (PPG), and polytetramethylene ether glycol (PTMG); a condensed polyester polyol such as polyethylene adipate (PEA), polybutylene adipate (PBA), and polyhexamethylene adipate (PHMA); a lactone polyester polyol such as poly-ε-caprolactone (PCL); a polycarbonate polyol such as polyhexamethylene carbonate; and an acrylic polyol. The above polyols may be used alone or as a mixture of at least two of them. Among them, as the polymer polyol component, polytetramethylene ether glycol is preferably used. Use of the polytetramethylene ether glycol makes it possible to control the spin rates on middle or long iron shots and approach shots at the higher level.

The polymer polyol constituting the polyurethane elastomer used in the present invention preferably has a hydroxyl value of 561 mgKOH/g or less, more preferably 173 mgKOH/g or less and preferably has a hydroxyl value of 94 mgKOH/g or more, more preferably 112 mgKOH/g or more, even more preferably 132 mgKOH/g or more. The hydroxyl value of the polyol component can be measured, for example, by an acetylation method according to JIS K1557-1.

The polyurethane elastomer used in the present invention may further have a chain extender as a constituent, unless the effect of the preset invention deteriorates. The chain extender component includes a low-molecular weight polyol or a low-molecular weight polyamine. Examples of the low-molecular weight polyol may include a diol such as ethylene glycol, diethylene glycol, triethylene glycol, propanediol (e.g., 1,2-propanediol, and 1,3-propanediol), dipropylene glycol, butanediol (e.g., 1,2-butanediol, 1,3-butanediol, 1,4-butanediol, and 2,3-butanediol), neopentyl glycol, pentanediol, hexanediol, heptanediol, octanediol, and 1,4-cyclohexane dimethylol; a triol such as glycerin, trimethylol propane, and hexanetriol; a tetraol or a hexanol such as pentaerythritol and sorbitol.

The low-molecular weight polyamine that can be used as a chain extender component may include any polyamine, as long as it has at least two amino groups. The polyamine includes an aliphatic polyamine such as ethylenediamine, propylenediamine, butylenediamine, and hexamethylenediamine, an alicyclic polyamine such as isophoronediamine, piperazine, and an aromatic polyamine.

The aromatic polyamine has no limitation as long as it has at least two amino groups directly or indirectly bonded to an aromatic ring. Herein, the "indirectly bonded to the aromatic ring", for example, means that the amino group is bonded to the aromatic ring via a lower alkylene bond. Further, the aromatic polyamine includes, for example, a monocyclic aromatic polyamine having at least two amino groups bonded to one aromatic ring or a polycyclic aromatic polyamine having at least two aminophenyl groups each having at least one amino group bonded to one aromatic ring.

Examples of the monocyclic aromatic polyamine include a type such as phenylenediamine, tolylenediamine, diethyltoluenediamine, and dimethylthiotoluenediamine wherein amino groups are directly bonded to an aromatic ring; and a type such as xylylenediamine wherein amino groups are bonded to an aromatic ring via a lower alkylene group. Further, the polycyclic aromatic polyamine may include a poly (aminobenzene) having at least two aminophenyl groups directly bonded to each other or a compound having at least two aminophenyl groups bonded via a lower alkylene group or an alkylene oxide group. Among them, a diaminodiphenylalkane having two aminophenyl groups bonded to each other via a lower alkylene group is preferable. Typically preferred are 4,4'-diaminodiphenylmethane or the derivatives thereof.

The chain extender preferably has a molecular weight of 400 or less, more preferably 350 or less, even more preferably less than 200 and preferably has a molecular weight of 30 or more, more preferably 40 or more, even more preferably 45 or more. If the molecular weight is too large, it is difficult to distinguish the chain extender from the high-molecular weight polyol (polymer polyol) constituting a soft segment of the polyurethane. "Low molecular weight polyol" and "Low molecular weight polyamine" are low molecular compounds which do not have a molecular weight distribution, and are distinguished from the polymer polyol having a number average molecular weight from 200 to 6,000 obtained by polymerization of the low molecular weight compound.

The polyurethane elastomer used in the present invention has no limitation on the constitutional embodiments thereof. Examples of the constitutional embodiments are the embodiment where the polyurethane elastomer consists of the polyisocyanate component, the polyol component having a number average molecular weight from 200 to 6,000, and the embodiment where the polyurethane consists of the polyisocyanate component, the polyol component having a number average molecular weight from 200 to 6,000, and the chain extender component.

The polyurethane composition used in the present invention preferably has a slab hardness of 25 or more, more preferably 27 or more, even more preferably 29 or more, and preferably has a slab hardness of 53 or less, more preferably 51 or less, even more preferably 49 or less, in Shore D hardness. If the slab hardness of the polyurethane composition is too low, the spin rate on middle or long iron shots may increase, while if the slab hardness of the polyurethane composition is too high, the spin rate on approach shots may decrease.

The polyurethane elastomer used in the present invention may be either a thermoplastic polyurethane elastomer or a thermosetting polyurethane elastomer (two-component curing type polyurethane elastomer). The thermoplastic polyurethane elastomer is a polyurethane elastomer exhibiting plasticity by heating and generally means a polyurethane elastomer having a linear chain structure of a high molecular weight to a certain extent. On the other hand, the thermosetting polyurethane elastomer (two-component curing type polyurethane elastomer) is a polyurethane elastomer obtained by polymerization through a reaction between a relatively low-molecular weight urethane prepolymer and a curing agent. The thermosetting polyurethane elastomer includes a polyurethane elastomer having a linear chain structure or a polyurethane elastomer having a three-dimensional crosslinked structure depending on a number of a functional group of the prepolymer or the curing agent to be used. In the present invention, the thermoplastic polyurethane elastomer is preferable.

Examples of a method for synthesizing the polyurethane elastomer include a one-shot method and a prepolymer method. The one-shot method is a method of reacting a polyisocyanate component, a polyol component or the like at once. The prepolymer method is a method of reacting a polyisocyanate component and a polyol component or the like in multiple steps. For example, a relatively low-molecular weight urethane prepolymer is synthesized, followed by further polymerization to have a higher-molecular weight. The polyurethane used in the present invention is preferably produced by the prepolymer method.

As an example of producing the polyurethane elastomer by the prepolymer method, the following case will be described in detail, wherein an isocyanate group terminated urethane prepolymer is synthesized and then polymerized with the chain extender.

First, a polyisocyanate component is subjected to a urethane reaction with a polymer polyol component to synthesize an isocyanate group terminated urethane prepolymer. In this case, the charging ratio of the polyisocyanate component to the polymer polyol component is, preferably 1 or larger, more preferably 1.2 or larger, and even more preferably 1.5 or larger, and is preferably 10 or smaller, more preferably 9 or smaller, and even more preferably 8 or smaller in a molar ratio (NCO/OH) of the isocyanate group (NCO) contained in the polyisocyanate component to the hydroxyl group (OH) contained in the polyol component.

The temperature at which the prepolymer reaction is conducted is preferably 10° C. or higher, more preferably 30° C. or higher, and even more preferably 50° C. or higher, and is preferably 200° C. or lower, more preferably 150° C. or lower, and even more preferably 100° C. or lower. The reaction time for the prepolymer reaction is preferably 10 minutes or longer, more preferably 1 hour or longer, and even more preferably 3 hours or longer, and is preferably 32 hours or shorter, more preferably 16 hours or shorter, and even more preferably 8 hours or shorter.

Next, the obtained isocyanate group terminated urethane prepolymer is subjected to a chain extension reaction with the chain extender component to obtain the polyurethane elastomer having a high molecular weight. In this case, the charging ratio of the isocyanate group terminated urethane prepolymer to the chain extender component is preferably 0.9 or larger, more preferably 0.92 or larger, and even more preferably 0.95 or larger, and is preferably 1.1 or smaller, more preferably 1.08 or smaller, and even more preferably 1.05 or smaller in a molar ratio (NCO/OH or NH$_2$) of the isocyanate group (NCO) contained in the isocyanate group terminated urethane prepolymer to the hydroxyl group (OH) or amino group (NH$_2$) contained in the chain extender component.

The temperature at which the chain extension reaction is conducted is preferably 10° C. or higher, more preferably 30° C. or higher, and even more preferably 50° C. or higher, and is preferably 220° C. or lower, more preferably 170° C. or lower, and even more preferably 120° C. or lower. The reaction time for the chain extension reaction is preferably 10 minutes or longer, more preferably 30 minutes or longer, and even more preferably 1 hour or longer, and is preferably 20 days or shorter, more preferably 10 days or shorter, and even more preferably 5 days or shorter.

Both of the prepolymer reaction and the chain extension reaction are preferably conducted in an atmosphere of dry nitrogen.

In synthesizing the polyurethane elastomer, a publicly known catalyst may be used. Examples of the catalyst include a monoamine such as triethylamine, and N,N-dimethylcyclohexylamine, a polyamine such as N,N,N',N'-tetramethylethylenediamine, and N,N,N',N'',N''-pentamethyldiethylenetriamine; a cyclic diamine such as 1,8-diazabicyclo-[5.4.0]-7-undecene (DBU), triethylenediamine; a tin-based catalyst such as dibutyl tin dilaurylate, and dibutyl tin diacetate. These catalysts may be used solely, or two or more of these catalysts may be used in combination. Among these catalysts, a tin-based catalyst such as dibutyl tin dilaurylate, and dibutyl tin diacetate are preferable, and in particular, dibutyl tin dilaurylate is preferably used.

The polyurethane composition used in the present invention preferably contains only the polyurethane elastomer as the resin composition, but may further contain ionomer resins or thermoplastic elastomers, as long as they do not impair the effect of the present invention. In this case, the content of the polyurethane elastomer is preferably 50 mass % or more, more preferably 60 mass % or more, even more preferably 70 mass or more in the resin component. Especially, the content of the polyurethane elastomer using 1,4-bis(isocyanatomethyl)cyclohexane as the polyisocyanate component is preferably 50 mass % or more, more preferably 60 mass % or more, even more preferably 70 mass % or more in the resin component.

Examples of the ionomer resin include one prepared by neutralizing at least a part of carboxyl groups in a copolymer composed of ethylene and an α,β-unsaturated carboxylic acid having 3 to 8 carbon atoms with a metal ion; one prepared by neutralizing at least a part of carboxyl groups in a terpolymer composed of ethylene, an α,β-unsaturated carboxylic acid having 3 to 8 carbon atoms, and an α,β-unsaturated carboxylic acid ester with a metal ion; or a mixture of these two. Examples of the α,β-unsaturated carboxylic acid include acrylic acid, methacrylic acid, fumaric acid, maleic acid, crotonic acid, or the like. In particular, acrylic acid and methacrylic acid are preferable. Examples of the α,β-unsaturated carboxylic acid ester include methyl ester, ethyl ester, propyl ester, n-butyl ester, isobutyl ester of acrylic acid, methacrylic acid, fumaric acid, and maleic acid. In particular, acrylic acid ester and methacrylic acid ester are preferable. Examples of the neutralizing metal ion are: monovalent metal ions such as sodium, potassium, and lithium; divalent metal ions such as magnesium, calcium, zinc, barium, and cadmium; trivalent metal ions such as aluminum, or other metal ions such as tin and zirconium. In particular, sodium ion, zinc ion, and magnesium ion are preferably used in view of the resilience and durability of the golf ball.

Specific examples of the ionomer resin include "Himilan (registered trade mark)" available from MITSUI-DUPONT POLYCHEMICAL CO., LTD, "Surlyn (registered trade mark)" available from DUPONT CO, and "Iotek (registered trade mark)" available from Exxon Co.

Specific examples of the thermoplastic elastomers are a thermoplastic polyamide elastomer having a commercial name of "Pebax (registered trademark) (e.g. "Pebax 2533")" commercially available from Arkema K. K.; a thermoplastic polyurethane elastomer having a commercial name of "Elastollan (registered trademark) (e.g. "Elastollan XNY85A")" commercially available from BASF Japan Co.; a thermoplastic polyester elastomer having a commercial name of "Hytrel (registered trademark) (e.g. "Hytrel 3548", "Hytrel 4047")" commercially available from Du Pont-Toray Co., Ltd.; a thermoplastic styrene elastomer having a commercial name of "Rabalon (registered trademark) (e.g. "Rabalon T3221C")" commercially available from Mitsubishi Chemical Corporation. The ionomer resins and the thermoplastic elastomers can be used solely or as a mixture of at least two of them. In the case of using the thermoplastic elastomer in combination, the thermoplastic polyurethane elastomer without using 1,4-bis(isocyanatomethyl)cyclohexane as the polyisocyanate component is preferably used in combination.

The polyurethane composition used in the present invention is not limited, as long as the polyurethane composition contains the polyurethane elastomer described above as the resin component. The polyurethane composition used in the present invention may further contain a pigment component such as a white pigment (for example, titanium oxide) and a blue pigment, a gravity adjusting agent such as calcium carbonate and barium sulfate, a dispersant, an antioxidant, an ultraviolet absorber, a light stabilizer, a fluorescent material or a fluorescent brightener. In the case of blending additives to the polyurethane composition, the polyurethane composition blended with the additives should satisfy the properties of the rebound resilience, shear loss modulus, and slab hardness.

The content of the white pigment (for example, titanium oxide) is preferably 0.5 part by mass or more, more preferably 1 part by mass or more, and is preferably 10 parts by mass or less, more preferably 8 parts by mass or less based on 100 parts by mass of the resin component. The white pigment in an amount of 0.5 part by mass or more can impart opacity to the polyurethane composition, while the white pigment in an amount of more than 10 parts by mass may lower the durability of the constituting member of the resultant golf ball.

The cover of the golf ball of the present invention is formed from the above mentioned polyurethane composition (hereinafter, sometimes merely referred to as "cover composition"). A method for molding a cover is not particularly limited, and includes an embodiment which comprises injection molding the cover composition directly onto the core, or an embodiment which comprises molding the cover composition into a hollow-shell, covering the core with a plurality of the hollow-shells and subjecting the core with a plurality of the hollow shells to the compression-molding (preferably an embodiment which comprises molding the cover composition into a half hollow-shell, covering the core with the two half hollow-shells, and subjecting the core with the two half hollow-shells to the compression-molding).

Molding of the half shell can be performed by either compression molding method or injection molding method, and the compression molding method is preferred. The compression-molding of the cover composition into half shell can be carried out, for example, under a pressure of 1 MPa or more and 20 MPa or less at a temperature of −20° C. or more and 70° C. or less relative to the flow beginning temperature of the cover composition. By performing the molding under the above conditions, a half shell having a uniform thickness can be formed. Examples of a method for molding the cover using half shells include compression molding by covering the core with two half shells. The compression molding of half shells into the cover can be carried out, for example, under a pressure of 0.5 MPa or more and 25 MPa or less at a temperature of −20° C. or more and 70° C. or less relative to the flow beginning temperature of the cover composition. By performing the molding under the above conditions, a golf ball cover having a uniform thickness can be formed.

In the case of directly injection molding the cover composition onto the core, the cover composition in the pellet form obtained by extrusion may be used for injection molding, or the cover materials such as the base resin component, the pigment and the like may be dry blended, followed by directly injection molding. It is preferred to use upper and lower molds having a spherical cavity and pimples for forming a cover, wherein a part of the pimple also serves as a retractable hold pin. When forming the cover by injection molding, the hold pin is protruded to hold the core, and the cover composition which has been heated and melted is charged and then cooled to obtain a cover. For example, the cover composition heated and melted at the temperature of 150° C. to 250° C. is charged into a mold held under the pressure of 9 MPa to 15 MPa for 0.5 second to 5 seconds. After cooling for 10 to 60 seconds, the mold is opened and the golf ball with the cover molded is taken out from the mold.

In the present invention, the thickness of the cover of the golf ball is preferably 4.0 mm or less, more preferably 3.0 mm or less, even more preferably 2.0 mm or less. If the thickness of the cover is 4.0 mm or less, the resilience and shot feeling of the obtained golf ball become better. The thickness of the cover is preferably 0.3 mm or more, more preferably 0.5 mm or more, and even more preferably 0.8 mm or more, and most preferably 1.0 mm or more. If the thickness of the cover is less than 0.3 mm, the durability and the wear resistance of the cover may deteriorate. If the cover has a plurality of layers, it is preferred that the total thickness of the cover layers falls within the above range.

After the cover is molded, the golf ball body is taken out from the mold, and as necessary, the golf ball body is preferably subjected to surface treatments such as deburring, cleaning, and sandblast. If desired, a paint film or a mark may be formed. The paint film preferably has a thickness of, but not limited to, 5 μm or larger, and more preferably 7 μm or larger, and preferably has a thickness of 50 μm or smaller, and more preferably 40 μm or smaller, even more preferably 30 μm or smaller. If the thickness is smaller than 5 μm, the paint film is easy to wear off due to continued use of the golf ball, and if the thickness is larger than 50 μm, the effect of the dimples is reduced, resulting in lowering flying performance of the golf ball.

The concave portions called "dimple" are usually formed on the surface of the golf ball. The total number of the dimples is preferably 200 or more and 500 or less. If the total number is less than 200, the dimple effect is hardly obtained. On the other hand, if the total number exceeds 500, the dimple effect is hardly obtained because the size of the respective dimples is small. The shape (shape in a plan view) of dimples includes, for example, without limitation, a circle, polygonal shapes such as roughly triangular shape, roughly quadrangular shape, roughly pentagonal shape, roughly hexagonal shape, and another irregular shape. The shape of the dimples is employed solely or at least two of them may be used in combination.

The cover of the golf ball of the present invention preferably has a slab hardness of 25 or more, more preferably 27 or more, even more preferably 29 or more, and preferably has a slab hardness of 53 or less, more preferably 51 or less, even more preferably 49 or less, in Shore D hardness. If the slab hardness of the cover is too low, the spin rate on middle or long iron shots may increase, while if the slab hardness of the cover is too high, the spin rate on approach shots may decrease. Herein, the slab hardness of the cover is a measured hardness of the cover composition that is molded into a sheet form by a measuring method described later.

Next, a preferred embodiment of the spherical core of the golf ball of the present invention will be explained.

The spherical core has a hardness distribution that $R^2$ of a linear approximate curve determined by a least-squares method is 0.95 or more, when plotting JIS-C hardness measured at a center, a surface and at intervals of 2.5 mm from the center of the spherical core, versus distances from the center of the spherical core.

The spherical core was cut into two hemispheres to obtain a cut plane, and the hardness of the spherical core were measured at the central point and at intervals of 2.5 mm from the central point along the arbitrary radius of the spherical core. Although the number of measuring points changes depending upon the radius of the spherical core, the hardness distribution of the whole core is obtained by measuring the hardness at intervals of 2.5 mm. Further, the hardness at the surface of the spherical core is measured. Next, the JIS-C hardness measured as described above is assigned to the vertical axis and the distance (mm) from the core center is assigned to the horizontal axis, and measurement results are plotted therein to create a graph. In the present invention, $R^2$ of a linear approximation curve obtained from this plot by the least square method is 0.95 or higher. $R^2$ of a linear approximation curve obtained by the least square method is an index representing the linearity of an obtained plot. In the present invention, if $R^2$ is 0.95 or higher, it means that the hardness distribution of the spherical core is approximately linear. A golf ball with a spherical core having an approximately linear hardness distribution exhibits a reduced spin rate upon middle or long iron shots. As a result, a flight distance on middle or long iron shots increases. $R^2$ of the linear approximation curve is preferably 0.96 or higher. Increasing the linearity provides a greater flight distance on middle or long iron shots.

The hardness difference (Hs−Ho) between a core surface hardness Hs and a core central hardness Ho is preferably 15 or higher, more preferably 20 or higher, even more preferably 25 or higher, and is preferably 50 or lower, more preferably 45 or lower, even more preferably 40 or lower in JIS-C hardness. If the hardness difference between a surface and a center of the core is large, a golf ball having a higher launch angle and a low spin rate and traveling a great flight distance can be obtained.

The central hardness Ho of the spherical core is preferably 30 or more, more preferably 40 or more, even more preferably 45 or more, and even more preferably 50 or more in JIS-C hardness. If the central hardness Ho of the spherical core is less than 30 in JIS-C hardness, the spherical core is too soft and the resilience may be lowered. Further, the central hardness Ho of the spherical core is preferably 70 or less, more preferably 65 or less in JIS-C hardness. If the central hardness Ho exceeds 70, the spherical core is too hard and thus the shot feeling may be lowered.

The surface hardness Hs of the spherical core is preferably 78 or more, more preferably 80 or more, and is preferably 100 or less, more preferably 95 or less, even more preferably 90 or less. If the surface hardness of the spherical core is 78 or more in JIS-hardness, the spherical core does not become too soft and thus the better resilience can be obtained. If the surface hardness of the spherical core is 100 or less in JIS-C hardness, the spherical core does not become too hard and thus the better shot feeling is obtained.

The spherical core preferably has a diameter of 34.8 mm or more, more preferably 36.8 mm or more, even more preferably 38.8 mm or more, and preferably has a diameter of 42.2 mm or less, more preferably 41.8 mm or less, even more preferably 41.2 mm or less, most preferably 40.8 mm or less. If the spherical core has a diameter of 34.8 mm or more, the thickness of the cover does not become too thick, and hence the resilience becomes better. On the other hand, if the spherical core has a diameter of 42.2 mm or less, the thickness of the cover does not become too thin and thus the cover functions better.

When the spherical core has a diameter from 34.8 mm to 42.2 mm, a compression deformation amount (shrinking deformation amount of the core along the compression direction) of the core when applying a load from 98 N as an initial load to 1275 N as a final load is preferably 2.0 mm or more, more preferably 2.8 mm or more, and is preferably 6.0 mm or less, more preferably 5.0 mm or less, even more preferably 4.5 mm or less. If the compression deformation amount is 2.0 mm or more, the shot feeling of the golf ball becomes better. If the compression deformation amount is 6.0 mm or less, the resilience of the golf ball becomes better.

The spherical core of the golf ball of the present invention is preferably formed from a rubber composition comprising (a) a base rubber, (b) an α,β-unsaturated carboxylic acid having 3 to 8 carbon atoms and/or a metal salt thereof as a co-crosslinking agent, (c) a crosslinking initiator, and (d) a carboxylic acid and/or a salt thereof, provided that the rubber composition further contains (e) a metal compound in the case of containing only (b) the α,β-unsaturated carboxylic acid having 3 to 8 carbon atoms as the co-crosslinking agent. The rubber composition preferably further contains (f) an organic sulfur compound. The spherical core formed from the above rubber composition tends to have the hardness distribution where the hardness increases linearly or almost linearly from the center of the core toward the surface thereof.

The reason why the spherical core formed from the above rubber composition has the hardness distribution where the hardness increases linearly or almost linearly from the center of the core toward the surface thereof is considered as follows. When molding the core, the internal temperature of the core is high at the core central part and decreases toward the core surface, since reaction heat from a crosslinking reaction of the base rubber accumulates at the core central part. (d) The carboxylic acid and/or the salt thereof reacts with (b) the metal salt of the α,β-unsaturated carboxylic acid having 3 to 8 carbon atoms, when molding the core. That is, (d) the carboxylic acid and/or the salt thereof exchanges the cation with the metal salt of the α,β-unsaturated carboxylic acid having 3 to 8 carbon atoms, thereby breaking a metal crosslinking by the metal salt of the α,β-unsaturated carboxylic acid having 3 to 8 carbons atoms. This cation exchange reaction readily occurs at the core central part where the temperature is high, and less occurs toward the core surface. In other words, the breaking of the metal crosslinking readily occurs at the core central part, but less occurs toward the surface. As a result, it is conceivable that since a crosslinking density in the core increases from the center of the core toward the surface thereof, the core hardness increases linearly or almost linearly from the center of the core toward the surface thereof. In addition, by using (f) the organic sulfur compound together with (d) the carboxylic acid and/or the salt thereof, the slope of the hardness distribution can be controlled, and the degree of the outer-hard and inner-soft structure of the core can be further enhanced.

(a) The base rubber used in the present invention will be explained. As (a) the base rubber used in the present invention, natural rubber and/or synthetic rubber can be used. For example, polybutadiene rubber, natural rubber, polyisoprene rubber, styrene polybutadiene rubber, ethylene-propylene-diene rubber (EPDM), or the like can be used. These rubbers may be used solely or two or more of these rubbers may be used in combination. Among them, typically preferred is the high cis-polybutadiene having a cis-1,4 bond in a proportion of 40% or more, more preferably 80% or more, even more preferably 90% or more in view of its superior resilience property.

The high-cis polybutadiene preferably has a 1,2-vinyl bond in a content of 2 mass % or less, more preferably 1.7 mass % or less, and even more preferably 1.5 mass % or less. If the content of 1,2-vinyl bond is excessively high, the resilience may be lowered.

The high-cis polybutadiene preferably includes one synthesized using a rare earth element catalyst. When a neodymium catalyst, which employs a neodymium compound of a lanthanum series rare earth element compound, is used, a polybutadiene rubber having a high content of a cis-1,4 bond and a low content of a 1,2-vinyl bond is obtained with excellent polymerization activity. Such a polybutadiene rubber is particularly preferred.

The high-cis polybutadiene preferably has a Mooney viscosity ($ML_{1+4}$ (100° C.)) of 30 or more, more preferably 32 or more, even more preferably 35 or more, and preferably has a Mooney viscosity ($ML_{1+4}$ (100° C.)) of 140 or less, more preferably 120 or less, even more preferably 100 or less, and most preferably 80 or less. It is noted that the Mooney viscosity ($ML_{1+4}$ (100° C.)) in the present invention is a value measured according to JIS K6300 using an L rotor under the conditions of: a preheating time of 1 minute; a rotor revolution time of 4 minutes; and a temperature of 100° C.

The high-cis polybutadiene preferably has a molecular weight distribution Mw/Mn (Mw: weight average molecular weight, Mn: number average molecular weight) of 2.0 or more, more preferably 2.2 or more, even more preferably 2.4 or more, and most preferably 2.6 or more, and preferably has a molecular weight distribution Mw/Mn of 6.0 or less, more preferably 5.0 or less, even more preferably 4.0 or less, and most preferably 3.4 or less. If the molecular weight distribution (Mw/Mn) of the high-cis polybutadiene is excessively low, the processability may deteriorate. If the molecular weight distribution (Mw/Mn) of the high-cis polybutadiene is excessively high, the resilience may be lowered. It is noted that the measurement of the molecular weight distribution is conducted by gel permeation chromatography ("HLC-8120GPC", manufactured by Tosoh Corporation) using a differential refractometer as a detector under the conditions of column: GMHHXL (manufactured by Tosoh Corporation), column temperature: 40° C., and mobile phase: tetrahydrofuran, and calculated by converting based on polystyrene standard.

Next, (b) the α,β-unsaturated carboxylic acid having 3 to 8 carbon atoms and/or the metal salt thereof will be explained. (b) The α,β-unsaturated carboxylic acid having 3 to 8 carbon atoms and/or the metal salt thereof is blended as a co-crosslinking agent in the rubber composition and has an action of crosslinking a rubber molecule by graft polymerization to a base rubber molecular chain. In the case that the rubber composition used in the present invention contains only the α,β-unsaturated carboxylic acid having 3 to 8 carbon atoms as the co-crosslinking agent, the rubber composition preferably further contains (e) a metal compound. Neutralizing the α,β-unsaturated carboxylic acid having 3 to 8 carbon atoms with the metal compound in the rubber composition provides substantially the same effect as using the metal salt of the α,β-unsaturated carboxylic acid having 3 to 8 carbon atoms. Further, in the case of using the α,β-unsaturated carboxylic acid having 3 to 8 carbon atoms and the metal salt thereof in combination as the co-crosslinking agent, (e) the metal compound may be used.

The α,β-unsaturated carboxylic acid having 3 to 8 carbon atoms includes, for example, acrylic acid, methacrylic acid, fumaric acid, maleic acid, crotonic acid, and the like.

Examples of the metals constituting the metal salts of the α,β-unsaturated carboxylic acid having 3 to 8 carbon atoms include: monovalent metal ions such as sodium, potassium, lithium or the like; divalent metal ions such as magnesium, calcium, zinc, barium, cadmium or the like; trivalent metal ions such as aluminum ion or the like; and other metal ions such as zirconium or the like. The above metal ions can be used solely or as a mixture of at least two of them. Among these metal ions, divalent metal ions such as magnesium, calcium, zinc, barium, cadmium or the like are preferable. Use of the divalent metal salts of the α,β-unsaturated carboxylic acid having 3 to 8 carbon atoms easily generates a metal crosslinking between the rubber molecules. Especially, as the divalent metal salt, zinc acrylate is preferable, because the zinc acrylate enhances the resilience of the resultant golf ball. The α,β-unsaturated carboxylic acid having 3 to 8 carbon atoms and/or a metal salt thereof may be used solely or in combination at least two of them.

The content of (b) the α,β-unsaturated carboxylic acid having 3 to 8 carbon atoms and/or the metal salt thereof is preferably 15 parts by mass or more, more preferably 20 parts by mass or more, and is preferably 50 parts by mass or less, more preferably 45 parts by mass or less, even more preferably 35 parts by mass or less, with respect to 100 parts by mass of (a) the base rubber. If the content of (b) the α,β-unsaturated carboxylic acid having 3 to 8 carbon atoms and/or the metal salt thereof is less than 15 parts by mass, the content of (c) the co-crosslinking initiator which will be explained below must be increased in order to obtain the appropriate hardness of the constituting member formed from the rubber composition, which tends to cause the lower resilience. On the other hand, if the content of (b) the α,β-unsaturated carboxylic acid having 3 to 8 carbon atoms and/or the metal salt thereof exceeds 50 parts by mass, the constituting member formed from the rubber composition becomes excessively hard, which tends to cause the lower shot feeling.

(c) The crosslinking initiator is blended in order to crosslink (a) the base rubber component. As (c) the crosslinking initiator, an organic peroxide is preferred. Specific examples of the organic peroxide include organic peroxides such as dicumyl peroxide, 1,1-bis(t-butylperoxy)-3,3,5-trimethylcyclohexane, 2,5-dimethyl-2,5-di(t-butylperoxy)hexane, and di-t-butyl peroxide. These organic peroxides may be used solely or two or more of these organic peroxides may be used in combination. Among them, dicumyl peroxide is preferably used.

The content of (c) the crosslinking initiator is preferably 0.2 part by mass or more, and more preferably 0.5 part by mass or more, and is preferably 5.0 parts by mass or less, and more preferably 2.5 parts by mass or less, with respect to 100 parts by mass of (a) the base rubber. If the content of (c) the crosslinking initiator is less than 0.2 part by mass, the constituting member formed from the rubber composition becomes too soft, and thus the golf ball may have the lower resilience. If the content of (c) the crosslinking initiator exceeds 5.0 parts by mass, the amount of (b) the co-crosslinking agent must be decreased in order to obtain the appropriate hardness of the constituting member formed from the rubber composition, resulting in the insufficient resilience and lower durability of the golf ball.

Next, (d) the carboxylic acid and/or the salt thereof will be explained. It is conceivable that (d) the carboxylic acid and/or the salt thereof has an action of breaking the metal crosslinking by the metal salt of (b) the α,β-unsaturated carboxylic acid having 3 to 8 carbon atoms at the center part of the core, when molding the core. (d) The carboxylic acid is not limited, as long as it is a compound having a carboxyl group, but does not include (b) the α,β-unsaturated carboxylic acid having 3 to 8 carbon atoms as the co-crosslinking agent.

(d) The carboxylic acid may include any one of an aliphatic carboxylic acid (sometimes may be merely referred to as "fatty acid" in the present invention) or an aromatic carboxylic acid, as long as the carboxylic acid exchanges a cation component with the metal salt of (b) the α,β-unsaturated carboxylic acid having 3 to 8 carbon atoms. As the carboxylic acid, a carboxylic acid having 4 to 30 carbon atoms is preferred, a carboxylic acid having 5 to 28 carbon atoms is more preferred, and a carboxylic acid having 6 to 26 carbon atoms is even more preferred.

The fatty acid may be either a saturated fatty acid or an unsaturated fatty acid; however, a saturated fatty acid is preferable. Specific examples of the saturated fatty acid (IUPAC name) are butanoic acid (C4), pentanoic acid (C5), hexanoic acid (C6), heptanoic acid (C7), octanoic acid (C8), nonanoic acid (C9), decanoic acid (C10), undecanoic acid (C11), dodecanoic acid (C12), tridecanoic acid (C13), tetradecanoic acid (C14), pentadecanoic acid (C15), hexadecanoic acid (C16), heptadecanoic acid (C17), octadecanoic acid (C18), nonadecanoic acid (C19), icosanoic acid (C20), henicosanoic acid (C21), docosanoic acid (C22), tricosanoic acid (C23), tetracosanoic acid (C24), pentacosanoic acid (C25), hexacosanoic acid (C26), heptacosanoic acid (C27), octacosanoic acid (C28), nonacosanoic acid (C29), and triacontanoic acid (C30).

Specific examples of the unsaturated fatty acid (IUPAC name) are butenoic acid (C4), pentenoic acid (C5), hexenoic acid (C6), heptenoic acid (C7), octenoic acid (C8), nonenoic acid (C9), decenoic acid (C10), undecenoic acid (C11), dodecenoic acid (C12), tridecenoic acid (C13), tetradecenoic acid (C14), pentadecenoic acid (C15), hexadecenoic acid (C16), heptadecenoic acid (C17), octadecenoic acid (C18), nonadecenoic acid (C19), icosenoic acid (C20), henicosenoic acid (C21), docosenoic acid (C22), tricosenoic acid (C23), tetracosenoic acid (C24), penacosenoic acid (C25), hexacosenoic acid (C26), heptacosenoic acid (C27), octacosenoic acid (C28), nonacosenoic acid (C29), and triacontenoic acid (C30).

Specific examples of the fatty acid (Common name) are, butyric acid (C4), valeric acid (C5), caproic acid (C6), enanthic acid (C7), caprylic acid (C8), pelargonic acid (C9), capric acid (C10), lauric acid (C12), myristic acid (C14), myristoleic acid (C14), pentadecylic acid (C15), palmitic acid (C16), palmitoleic acid (C16), margaric acid (C17), stearic acid (C18), elaidic acid (C18), vaccenic acid (C18), oleic acid (C18), linoleic acid (C18), linolenic acid (C18), 12-hydroxystearic acid (C18), arachidic acid (C20), gadoleic acid (C20), arachidonic acid (C20), eicosenoic acid (C20), behenic acid (C22), erucic acid (C22), lignoceric acid (C24), nervonic acid (C24), cerotic acid (C26), montanic acid (C28), and melissic acid (C30). The fatty acid may be used alone or as a mixture of at least two of them. Among those described above, capric acid, myristic acid, palmitic acid, setaric acid, behenic acid and oleic acid are preferable as the fatty acid.

There is no particular limitation on the aromatic carboxylic acid, as long as it is a compound that has an aromatic ring and a carboxyl group. Specific examples of the aromatic carboxylic acids include, for example, benzoic acid (C7), phthalic acid (C8), isophthalic acid (C8), terephthalic acid (C8), hemimellitic acid (benzene-1,2,3-tricarboxylic acid) (C9), trimellitic acid (benzene-1,2,4-tricarboxylic acid) (C9), trimesic acid (benzene-1,3,5-tricarboxylic acid) (C9), mellophanic acid (benzene-1,2,3,4-tetracarboxylic acid) (C10), prehnitic acid (benzene-1,2,3,5-tetracarboxylic acid) (C10), pyromellitic acid (benzene-1,2,4,5-tetracarboxylic acid) (C10), mellitic acid (benzene hexacarboxylic acid) (C12), diphenic acid (biphenyl-2,2'-dicarboxylic acid) (C12), toluic acid (methylbenzoic acid) (C8), xylic acid (C9), prehnitylic acid (2,3,4-trimethylbenzoic acid) (C10), γ-isodurylic acid (2,3,5-trimethylbenzoic acid) (C10), durylic acid (2,4,5-trimethylbenzoic acid) (C10), β-isodurylic acid (2,4,6-trimethylbenzoic acid) (C10), α-isodurylic acid (3,4,5-trimethylbenzoic acid) (C10), cuminic acid (4-isopropylbenzoic acid) (C10), uvitic acid (5-methylisophthalic acid) (C9), α-toluic acid (phenylacetic acid) (C8), hydratropic acid (2-phenylpropanoic acid) (C9), and hydrocinnamic acid (3-phenylpropanoic acid) (C9).

Furthermore, examples of the aromatic carboxylic acids substituted with a hydroxyl group, an alkoxy group, or an oxo group include, for example, salicylic acid (2-hydroxybenzoic acid) (C7), anisic acid (methoxybenzoic acid) (C8), cresotinic acid (hydroxy(methyl)benzoic acid) (C8), o-homosalicylic acid (2-hydroxy-3-methyl benzoic acid) (C8), m-homosalicylic acid (2-hydroxy-4-methylbenzoic acid) (C8), p-homosalicylic acid (2-hydroxy-5-methylbenzoic acid) (C8), o-pyrocatechuic acid (2,3-dihydroxybenzoic acid) (C7), β-resorcylic acid (2,4-dihydroxybenzoic acid) (C7), γ-resorcylic acid (2,6-dihydroxybenzoic acid) (C7), protocatechuic acid (3,4-dihydroxybenzoic acid) (C7), α-resorcylic acid (3,5-dihydroxybenzoic acid) (C7), vanillic acid (4-hydroxy-3-methoxybenzoic acid) (C8), isovanillic acid (3-hydroxy-4-methoxybenzoic acid) (C8), veratric acid (3,4- dimethoxybenzoic acid) (C9), o-veratric acid (2,3-dimethoxybenzoic acid) (C9), orsellinic acid (2,4-dihydroxy-6-methylbenzoic acid) (C8), m-hemipinic acid (4,5-dimethoxyphthalic acid) (C10), gallic acid (3,4,5-trihydroxybenzoic acid) (C7), syringic acid (4-hydroxy-3,5-dimethoxybenzoic acid) (C9), asaronic acid (2,4,5-trimethoxybenzoic acid) (C10), mandelic acid (hydroxy (phenyl)acetic acid) (C8), vanilmandelic acid (hydroxy(4-hydroxy-3-methoxy phenyl)acetic acid) (C9), homoanisic acid ((4-methoxy phenyl)acetic acid) (C9), homogentisic acid ((2,5-dihydroxyphenyl)acetic acid) (C8), homoprotocatechuic acid ((3,4-dihydroxyphenyl)acetic acid) (C8), homovanillic acid ((4-hydroxy-3-methoxy phenyl)acetic acid) (C9), homoisovanillic acid ((3-hydroxy-4-methoxy phenyl) acetic acid) (C9), homoveratric acid ((3,4-dimethoxy phenyl) acetic acid) (C10), o-homoveratric acid ((2,3-dimethoxy phenyl)acetic acid) (C10), homophthalic acid (2-(carboxymethyl)benzoic acid) (C9), homoisophthalic acid (3-(carboxymethyl)benzoic acid) (C9), homoterephthalic acid (4-(carboxymethyl)benzoic acid) (C9), phthalonic acid (2-(carboxycarbonyl)benzoic acid) (C9), isophthalonic acid (3-(carboxycarbonyl)benzoic acid) (C9), terephthalonic acid (4-(carboxycarbonyl)benzoic acid) (C9), benzilic acid (hydroxydiphenylacetic acid) (C14), atrolactic acid (2-hydroxy-2-phenylpropanoic acid) (C9), tropic acid (3-hydroxy-2-phenylpropanoic acid) (C9), melilotic acid (3-(2-hydroxyphenyl)propanoic acid) (C9), phloretic acid (3-(4-hydroxy phenyl)propanoic acid) (C9), hydrocaffeic acid (3-(3,4-dihydroxyphenyl)propanoic acid) (C9), hydroferulic acid (3-(4-hydroxy-3-methoxy phenyl)propanoic acid) (C10), hydroisoferulic acid (3-(3-hydroxy-4-methoxy phenyl)propanoic acid) (C10), p-coumaric acid (3-(4-hydroxy phenyl)acrylic acid) (C9), umbellic acid (3-(2,4-dihydroxyphenyl)acrylic acid) (C9), caffeic acid (3-(3,4-dihydroxyphenyl)acrylic acid) (C9), ferulic acid (3-(4-hydroxy-3-methoxy phenyl)acrylic acid) (C10), isoferulic acid (3-(3-hydroxy-4-methoxy phenyl)acrylic acid) (C10), and sinapic acid (3-(4-hydroxy-3,5-dimethoxy phenyl)acrylic acid) (C11).

(d) The salt of the carboxylic acid includes salts of the carboxylic acids mentioned above. The cation component of the salt of the carboxylic acid may be any one of a metal ion, an ammonium ion and an organic cation. The metal ion includes monovalent metal ions such as sodium, potassium, lithium, silver and the like; bivalent metal ions such magnesium, calcium, zinc, barium, cadmium, copper, cobalt, nickel, manganese and the like; trivalent metal ions such as aluminum, iron and the like; and other ions such as tin, zirconium, titanium and the like. These cation components may be used alone or as a mixture of at least two of them.

The organic cation includes a cation having a carbon chain. The organic cation includes, for example, without limitation, an organic ammonium ion. Examples of the organic ammonium ion are: primary ammonium ions such as stearyl ammonium ion, hexyl ammonium ion, octyl ammonium ion, 2-ethyl hexyl ammonium ion or the like; secondary ammonium ions such as dodecyl (lauryl) ammonium ion, octadecyl (stearyl) ammonium ion or the like; tertiary ammonium ions such as trioctyl ammonium ion or the like; and quaternary ammonium ion such as dioctyldimethyl ammonium ion, distearyldimethyl ammonium ion or the like. These organic cation may be used alone or as a mixture of at least two of them.

As (d) the salt of the carboxylic acid, more preferred are the potassium salt, magnesium salt, aluminum salt, zinc salt, iron salt, copper salt, nickel salt, or cobalt salt of caprylic acid (octanoic acid), capric acid (decanoic acid), lauric acid, myristic acid, palmitic acid, stearic acid, behenic acid, or oleic acid.

The content of (d) the carboxylic acid and/or the salt thereof is preferably 0.5 parts by mass or more, more preferably 1.0 part by mass or more, and is preferably 40 parts by mass or less, more preferably 35 parts by mass or less, even more preferably 30 parts by mass or less. If the content is less than 0.5 parts by mass, the effect of adding (d) the carboxylic acid and/or the salt thereof is not sufficient, and thus the linearity of the core hardness distribution may be lowered. If the content is more than 40 parts by mass, the resilience of the core may be lowered, since the hardness of the resultant core may be lowered as a whole. It is noted that the content of (d) the carboxylic acid and/or the salt thereof is affected by the number of carbon atoms of the carboxylic acid to be added. There is a tendency that the content becomes smaller as the number of carbon atoms becomes smaller.

In the case of using only the salt of the carboxylic acid as (d) the carboxylic acid and/or the salt thereof, it is more preferred that the content of the salt of the carboxylic acid is as follows. The content of (d) the salt of the carboxylic acid is preferably 10 parts by mass or more, more preferably 12 parts by mass or more, and is preferably less than 40 parts by mass, more preferably 30 parts by mass or less, even more preferably 25 parts by mass or less with respect to 100 parts by mass of (a) the base rubber. If the content of (d) the salt of the carboxylic acid is less than 10 parts by mass, the effect of adding (d) the salt of the carboxylic acid is not sufficient, and thus the linearity of the core hardness distribution may be lowered. If the content is 40 parts by mass or more, the resilience of the core may be lowered, since the hardness of the resultant core may be lowered as a whole.

There are cases where the surface of zinc acrylate used as the co-crosslinking agent is treated with a carboxylic acid and/or a salt thereof (for example, stearic acid and/or zinc stearate) to improve the dispersibility to the rubber. In the case of using zinc acrylate whose surface is treated with the carboxylic acid and/or the salt thereof, in the present invention, the amount of the carboxylic acid and/or the salt thereof used as a surface treating agent is included in the content of (d) the carboxylic acid and/or the salt thereof. For example, if 25 parts by mass of zinc acrylate whose surface treatment amount with the carboxylic acid and/or the salt thereof is 10 mass % is used, the amount of the carboxylic acid and/or the salt thereof is 2.5 parts by mass and the amount of zinc acrylate is 22.5 parts by mass. Thus, 2.5 parts by mass is counted as the content of (d) the carboxylic acid and/or the salt thereof.

In the case that the rubber composition used in the present invention contains only the α,β-unsaturated carboxylic acid having 3 to 8 carbon atoms as the co-crosslinking agent, the rubber composition further contains (e) a metal compound as an essential component. (e) The metal compound is not limited as long as it can neutralize (b) the α,β-unsaturated carboxylic acid having 3 to 8 carbon atoms in the rubber composition. (e) The metal compound includes, for example, metal hydroxides such as magnesium hydroxide, zinc hydroxide, calcium hydroxide, sodium hydroxide, lithium hydroxide, potassium hydroxide, copper hydroxide, and the like; metal oxides such as magnesium oxide, calcium oxide, zinc oxide, copper oxide, and the like; metal carbonates such as magnesium carbonate, zinc carbonate, calcium carbonate, sodium carbonate, lithium carbonate, potassium carbonate, and the like. Among these, (e) the metal compound preferably includes a divalent metal compound, more preferably includes a zinc compound. The divalent metal compound reacts with the α,β-unsaturated carboxylic acid having 3 to 8 carbon atoms, thereby forming a metal crosslinking. Use of the zinc compound provides a golf ball with excellent resilience. (e) These metal compounds are used solely or as a mixture of at least two of them.

The rubber composition used in the present invention preferably further contains (f) an organic sulfur compound. By using (f) the organic sulfur compound in addition to (d) the carboxylic acid and/or the salt thereof for the rubber composition, the degree of the outer-hard and inner-soft structure of the core can be controlled, while maintaining the linearity of the core hardness distribution. (f) The organic sulfur compound is not particularly limited, as long as it is an organic compound having a sulfur atom in the molecule thereof. Examples thereof include an organic compound having a thiol group (—SH), a polysulfide bond having 2 to 4 sulfur atoms (—S—S—, —S—S—S—, or —S—S—S—S—), or a metal salt thereof (—SM, —S-M-S—, —S-M-S—S—, —S—S-M-S—S—, —S-M-S—S—S—, or the like; M is a metal atom). Furthermore, (f) the organic sulfur compound may be any one of aliphatic compounds (aliphatic thiol, aliphatic thiocarboxylic acid, aliphatic dithiocarboxylic acid, aliphatic polysulfides, or the like), heterocyclic compounds, alicyclic compounds (alicyclic thiol, alicyclic thiocarboxylic acid, alicyclic dithiocarboxylic acid, alicyclic polysulfides, or the like), and aromatic compounds. (f) The organic sulfur compound includes, for example, thiophenols, thionaphthols, polysulfides, thiocarboxylic acids, dithiocarboxylic acids, sulfenamides, thiurams, dithiocarbamates, and thiazoles. From the aspect of the larger hardness distribution of the core, (f) the organic sulfur compound preferably includes, organic compounds having a thiol group (—SH) or a metal salt thereof, more preferably thiophenols, thionaphthols, or a metal salt thereof. Examples of the metal salts are salts of monovalent metals such as sodium, lithium, potassium, copper (I), and silver (I), and salts of divalent metals such as zinc, magnesium, calcium, strontium, barium, titanium (II), manganese (II), iron (II), cobalt (II), nickel(II), zirconium(II), and tin (II).

Examples of the thiophenols include, for example, thiophenol; thiophenols substituted with a fluoro group, such as 4-fluorothiophenol, 2,5-difluorothiophenol, 2,4,5-trifluorothiophenol, 2,4,5,6-tetrafluorothiophenol, pentafluorothiophenol and the like; thiophenols substituted with a chloro group, such as 2-chlorothiophenol, 4-chlorothiophenol, 2,4-dichlorothiophenol, 2,5-dichlorothiophenol, 2,6-dichlorothiophenol, 2,4,5-trichlorothiophenol, 2,4,5,6-tetrachlorothiophenol, pentachlorothiophenol and the like; thiophenols substituted with a bromo group, such as 4-bromothiophenol, 2,5-dibromothiophenol, 2,4,5-tribromothiophenol, 2,4,5,6-tetrabromothiophenol, pentabromothiophenol and the like; thiophenols substituted with an iodo group, such as 4-iodothiophenol, 2,5-diiodothiophenol, 2,4,5-triiodothiophenol, 2,4,5,6-tetraiodothiophenol, pentaiodothiophenol and the like; or a metal salt thereof. As the metal salt, zinc salt is preferred.

Examples of the naphthalenethiols (thionaphthols) are 2-naphthalenethiol, 1-naphthalenethiol, 2-chloro-1-naphthalenethiol, 2-bromo-1-naphthalenethiol, 2-fluoro-1-naphthalenethiol, 2-cyano-1-naphthalenethiol, 2-acetyl-1-naphthalenethiol, 1-chloro-2-naphthalenethiol, 1-bromo-2-naphthalenethiol, 1-fluoro-2-naphthalenethiol, 1-cyano-2-naphthalenethiol, and 1-acetyl-2-naphthalenethiol and metal salts thereof. Preferable examples include 1-naphthalenethiol, 2-naphthalenethiol and zinc salt thereof.

The sulfenamide based organic sulfur compound includes, for example, N-cyclohexyl-2-benzothiazole sulfenamide, N-oxydiethylene-2-benzothiazole sulfenamide, and N-t-butyl-2-benzothiazole sulfenamide. The thiuram based organic sulfur compound includes, for example, tetramethylthiuram monosulfide, tetramethylthiuram disulfide, tetraethylthiuram disulfide, tetrabutylthiuram disulfide, and dipentamethylenethiuram tetrasulfide. The dithiocarbamates include, for example, zinc dimethyldithiocarbamate, zinc diethyldithiocarbamate, zinc dibutyldithiocarbamate, zinc ethylphenyl dithiocarbamate, sodium dimethyldithiocarbamate, sodium diethyldithiocarbamate, copper (II) dimethyldithiocarbate, iron (III) dimethyldithiocarbamate, selenium diethyldithiocarbamate, and tellurium diethyldithiocarbamate. The thiazole based organic sulfur compound includes, for example, 2-mercaptobenzothiazole (MBT), dibenzothiazyl disulfide (MBTS), sodium salt, zinc salt, copper salt, or cyclohexylamine salt of 2-mercaptobenzothiazole, 2-(2,4-dinitrophenyl)mercaptobenzothiazole, and 2-(2,6-diethyl-4-morpholinothio)benzothiazole.

(f) The organic sulfur compound can be used solely or as a mixture of at least two of them.

The content of (f) the organic sulfur compound is preferably 0.05 part by mass or more, more preferably 0.1 part by mass or more, and is preferably 5.0 parts by mass or less, more preferably 2.0 parts by mass or less, with respect to 100 parts by mass of (a) the base rubber. If the content of (f) the organic sulfur compound is less than 0.05 part by mass, the effect of adding (f) the organic sulfur compound cannot be obtained and thus the resilience may not improve. If the content of (f) the organic sulfur compound exceeds 5.0 parts by mass, the compression deformation amount of the obtained golf ball becomes large and thus the resilience may be lowered.

The rubber composition used in the present invention may include additives such as a pigment, a filler for adjusting weight or the like, an antioxidant, a peptizing agent, and a softener where necessary. Further, as described above, if the rubber composition used in the present invention contains only the α,β-unsaturated carboxylic acid having 3 to 8 carbon atoms as a co-crosslinking agent, the rubber composition preferably contains (e) the metal compound.

Examples of the pigment blended in the rubber composition include a white pigment, a blue pigment, and a purple pigment. As the white pigment, titanium oxide is preferably used. The type of titanium oxide is not particularly limited, but rutile type is preferably used because of the high opacity. The blending amount of titanium oxide is preferably 0.5 part by mass or more, and more preferably 2 parts by mass or more, and is preferably 8 parts by mass or less, and more preferably 5 parts by mass or less, with respect to 100 parts by mass of (a) the base rubber.

It is also preferred that the rubber composition contains both a white pigment and a blue pigment. The blue pigment is blended in order to cause white color to be vivid, and examples thereof include ultramarine blue, cobalt blue, and phthalocyanine blue. Examples of the purple pigment include anthraquinone violet, dioxazine violet, and methyl violet.

The blending amount of the blue pigment is preferably 0.001 part by mass or more, and more preferably 0.05 part by mass or more, and is preferably 0.2 part by mass or less, and more preferably 0.1 part by mass or less, with respect to 100 parts by mass of (a) the base rubber. If the blending amount of the blue pigment is less than 0.001 part by mass, blueness is insufficient, and the color looks yellowish. If the blending amount of the blue pigment exceeds 0.2 part by mass, blueness is excessively strong, and a vivid white appearance is not provided.

The filler blended in the rubber composition is used as a weight adjusting agent for mainly adjusting the weight of the golf ball obtained as a final product. The filler may be blended where necessary. The filler includes, for example, inorganic fillers such as zinc oxide, barium sulfate, calcium carbonate, magnesium oxide, tungsten powder, molybdenum powder, or the like. The content of the filler is preferably 0.5 part by mass or more, more preferably 1 part by mass or more, and is preferably 30 parts by mass or less, more preferably 25 parts by mass or less, even more preferably 20 parts by mass or less. If the content of the filler is less than 0.5 part by mass, it is difficult to adjust the weight, while if the content of the filler exceeds 30 parts by mass, the weight ratio of the rubber component is reduced and thus the resilience tends to be lowered.

The blending amount of the antioxidant is preferably 0.1 part by mass or more and 1 part by mass or less, with respect to 100 parts by mass of (a) the base rubber. In addition, the blending amount of the peptizing agent is preferably 0.1 part by mass or more and 5 parts by mass or less, with respect to 100 parts by mass of (a) the base rubber.

The rubber composition used in the present invention is obtained by mixing and kneading (a) the base rubber, (b) the α,β-unsaturated carboxylic acid having 3 to 8 carbon atoms and/or the metal salt thereof, (c) the crosslinking initiator, and (d) the carboxylic acid and/or the salt thereof, and other additives where necessary. The kneading can be conducted, without any limitation, with a well-known kneading machine such as a kneading roll, a banbury mixer, a kneader, or the like.

The spherical core of the golf ball of the present invention can be obtained by molding the rubber composition after kneaded. The temperature for molding the spherical core is preferably 120° C. or more, more preferably 150° C. or more, even more preferably 160° C. or more, and is preferably 170° C. or less. If the molding temperature exceeds 170° C., the surface hardness of the core tends to decrease. The molding pressure preferably ranges from 2.9 MPa to 11.8 MPa. The molding time preferably ranges from 10 minutes to 60 minutes.

The golf ball construction of the present invention is not limited, as long as the golf ball of the present invention comprises a spherical core and at least one cover layer covering the spherical core. The spherical core preferably has a single layered structure. Unlike the multi-layered structure, the spherical core of the single layered structure does not have an energy loss at the interface of the multi-layered structure when hitting, and thus has an improved resilience. The cover may have at least one layered structure of, for example, a single-layered structure or at least two layered structure. In the case of the multi-layered cover, the outermost layer may be formed from the polyurethane composition described above. All the layers may be formed from the polyurethane composition described above. Materials for the inner cover layers, for example, include the ionomer resin or other thermoplastic elastomers that are exemplified as being able to be contained in the polyurethane composition.

The golf ball of the present invention includes, for example, a two-piece golf ball comprising a spherical core and a single layered cover disposed around the spherical core, a multi-piece golf ball comprising a spherical core, and at least two cover layers disposed around the spherical core (including the three-piece golf ball), and a wound golf ball comprising a spherical core, a rubber thread layer which is formed around the spherical core, and a cover disposed over the rubber thread layer. The present invention can be suitably applied to any one of the above golf balls.

When the golf ball of the present invention has a diameter in a range from 40 mm to 45 mm, a compression deformation amount of the golf ball (shrinking amount of the golf ball in the compression direction thereof) when applying a load from an initial load of 98 N to a final load of 1275 N to the golf ball is preferably 2.5 mm or more, more preferably 2.8 mm or more, even more preferably 3.0 mm or more, and is preferably 4.5 mm or less, more preferably 4.2 mm or less, even more preferably 4.0 mm or less. If the compression deformation amount is 2.5 mm or more, the golf ball does not become excessively hard, and thus exhibits the good shot feeling. On the other hand, if the compression deformation amount is 4.5 mm or less, the resilience is enhanced.

EXAMPLES

The following examples illustrate the present invention, however these examples are intended to illustrate the invention and are not to be construed to limit the scope of the present invention. Many variations and modifications of such examples will exist without departing from the scope of the inventions. Such variations and modifications are intended to be within the scope of the invention.

Evaluation Methods (1) Shear Loss Modulus G"
The shear loss modulus G" of the polyurethane composition was measured at the following conditions.
Apparatus: Rheometer ARES available from TA instruments
Test piece: A polyurethane sheet having a thickness of 2 mm was produced by a press molding and a test piece was cut out to have a width 10 mm and a length between the clamps of 10 mm.
Measuring mode: shear mode
Measuring temp.: 0° C.
Oscillation frequency: 10 Hz
Measuring strain: 0.1%
(2) Slab Hardness (Shore D Hardness)
Sheets having a thickness of about 2 mm were prepared from the polyurethane composition by heat press-molding and preserved at the temperature of 23° C. for two weeks. Three or more of the sheets were stacked on one another to avoid being affected by the measuring substrate on which the sheets were placed, and the stack was subjected to the measurement using a P1 type auto hardness tester provided with the Shore D type spring hardness tester prescribed by ASTM-D2240, available from KOUBUNSHI KEIKI CO., LTD to obtain the slab hardness of the polyurethane composition.
(3) Rebound Resilience (%)
A sheet with a thickness of about 2 mm was produced by heat press molding from the polyurethane composition. A circle-shaped test piece having a diameter of 28 mm was cut out of this sheet, and 6 pieces of the test piece were stacked to prepare a cylindrical test piece having a thickness of about 12 mm and a diameter of 28 mm. The cylindrical test piece was subjected to the Lupke type rebound resilience test (testing temperature 23° C., humidity 50RH %). Preparation of the test piece and the testing method are based on JIS K6255.
(4) Hardness Distribution of Spherical Core (JIS-C Hardness)
A type P1 auto loading durometer manufactured by Kobunshi Keiki Co., Ltd., provided with a JIS-C type spring hardness tester was used to measure the hardness of the spherical core. The hardness measured at the surface of the spherical core was adopted as the surface hardness of the spherical core. The spherical core was cut into two hemi-spherical to obtain a cut plane, and the hardness was measured at the central point and at predetermined distances (2.5 mm intervals) from the central point. The core hardness was measured at 4 points at predetermined distances from the central point of the cut plane of the core. The core hardness was calculated by averaging the hardness measured at 4 points.

(5) Scuff Resistance

A commercially available sand wedge (available from SRI sports, Ltd., Shaft: S) was installed on a swing robot available from Golf Laboratories, Inc., and two points of each golf ball were hit once at the head speed of 36 m/s. The scuff resistance was evaluated based on the following four criteria.

E (Excellent): No scratch was present, or scratches were hardly conspicuous.

G (Good): A few scratches could be observed, but were barely annoying.

F (Fair): Scratches were conspicuous and scuffing was slightly observed on the surface.

P (Poor): The surface was scraped away considerably, and scuffing was conspicuous.

(6) Coefficient of Restitution

A 198.4 g of metal cylindrical object was allowed to collide with each golf ball at a speed of 40 m/sec, and the speeds of the cylindrical object and the golf ball before and after the collision were measured. Based on these speeds and the mass of each object, coefficient of restitution for each golf ball was calculated. The measurement was conducted by using twelve of each golf ball, and the average value was adopted as the coefficient of restitution for the golf ball.

(7) Spin Rate on Approach Shots

An approach wedge (CG15 forged wedge 52°, available from Cleveland Golf) was installed on a swing robot available from Golf Laboratories, Inc. Golf balls were hit at a head speed of 21 m/sec., and a sequence of photographs of the hit golf balls were taken for measuring the spin rate (rpm). The measurement was performed ten times for each golf ball, and the average value is adopted as the spin rate (rpm). The spin rate of each golf ball was shown as a difference from the spin rate of the golf ball No. 20.

(8) Flight Distance (m) and Spin Rate (rpm) on Middle or Long Iron Shots

Iron #5 (ZTX DGS200 available from SRI sports) was installed on a swing robot M/C available from Golf Laboratories, Inc. Golf balls were hit at a head speed of 41 m/sec. The flight distance (carry) and the spin rate of the golf balls were measured. A sequence of photographs of the hit golf balls were taken for measuring the spin rate (rpm) of the golf balls right after hit. The measurement was performed twelve times for each golf ball, and the average value was adopted as the measurement value. The spin rate of each golf ball was shown as a difference from the spin rate of the golf ball No. 20. The fight distance of each golf ball was shown as an Index, assuming that the flying distance of the Golf ball No. 20 was an Index of 100.

Preparation of 1,4-bis(isocyanatomethyl)cyclohexane

Preparation Example 1

As a raw material, 1,4-bis(aminomethyl)cyclohexane (manufactured by Mitsubishi Gas Chemical Company, Inc.) having a trans-isomer/cis-isomer ratio of 93/7 determined by $^{13}$C-NMR was used to perform cold/hot two-stage phosgenation method under normal pressure. Specifically, a stirring rod, a thermometer, a phosgene inlet tube, a dropping funnel, and a condenser tube were attached to a flask, and the flask was charged with 400 parts by mass of ortho dichlorobenzene. While the flask was cooled with cold water, the temperature in the flask was lowered to 10° C. or below, and 280 parts by mass of phosgene was introduced thereinto from the phosgene inlet tube. The dropping funnel was charged with a mixed solution of 100 parts by mass of 1,4-bis(aminomethyl) cyclohexane and 500 parts by mass of ortho dichlorobenzene, and the mixed solution was added into the flask over 30 minutes. During this time, the temperature in the flask was maintained at 30° C. or below. After completion of the addition, a white slurry-like liquid was formed in the flask. Again, the reaction temperature was increased to 150° C. while introducing phosgene, and the reaction was continued at 150° C. for 5 hours. The reaction solution in the flask became a pale-brown transparent liquid. After completion of the reaction, nitrogen gas was introduced at a temperature of 100 to 150° C. at a flow rate of 10 L/hour for degassing. The ortho dichlorobenzene solvent was distilled away under reduced pressure and a fraction having a boiling point of 138 to 140° C./0.7 KPa was further sampled by vacuum distillation. Thus, 123 parts by mass (90% yield) of 1,4-bis(isocyanatomethyl)cyclohexane was obtained in the form of a colorless and transparent liquid. The resulting 1,4-bis(isocyanatomethyl)cyclohexane had a purity, which was determined by gas chromatography, of 99.9%, a hue of 5 in APHA, and a trans-isomer/cis-isomer ratio, which was determined by $^{13}$C-NMR, of 93/7. Hereinafter, 1,4-bis(isocyanatomethyl)cyclohexane having a trans-isomer/cis-isomer ratio of 93/7 is referred to as "BIC93".

Preparation Example 2

1,4-bis(isocyanatomethyl)cyclohexane was prepared in the same manner as Preparation Example 1 except that 1,4-bis(aminomethyl)cyclohexane (manufactured by Tokyo Chemical Industry Co., Ltd.) having a trans-isomer/cis-isomer ratio of 41/59 determined by $^{13}$C-NMR was used as a raw material. The obtained 1,4-bis(isocyanatomethyl)cyclohexane had a purity, determined by gas chromatography, of 99.9%, a hue of 5 in APHA, and a trans-isomer/cis-isomer ratio, determined by $^{13}$C-NMR, of 41/59. Hereinafter, 1,4-bis(isocyanatomethyl)cyclohexane having a trans-isomer/cis-isomer ratio of 41/59 is referred to as "BIC41".

Preparation Example 3

BIC93 and BIC41 were mixed in a ratio of 86.5:13.5 to prepare 1,4-bis(isocyanatomethyl)cyclohexane having a trans-isomer/cis-isomer ratio of 86/14. Hereinafter, 1,4-bis(isocyanatomethyl)cyclohexane having a trans-isomer/cis-isomer ratio of 86/14 is referred to as "BIC86".

Preparation Example 4

BIC93 and BIC41 were mixed in a ratio of 69.2:30.8 to prepare 1,4-bis(isocyanatomethyl)cyclohexane having a trans-isomer/cis-isomer ratio of 77/23. Hereinafter, 1,4-bis(isocyanatomethyl)cyclohexane having a trans-isomer/cis-isomer ratio of 77/23 is referred to as "BIC77".

Preparation Example 5

1,3-bis(isocyanatomethyl)cyclohexane was prepared in the same manner as Preparation Example 1 except that 1,3-bis(aminomethyl)cyclohexane (manufactured by Tokyo Chemical Industry Co., Ltd.) having a trans-isomer/cis-isomer ratio of 74/26 determined by $^{13}$C-NMR was used as a raw material. The obtained 1,3-bis(isocyanatomethyl)cyclohexane had a purity, determined by gas chromatography, of 99.9%, a hue of 5 in APHA, and a trans-isomer/cis-isomer ratio, determined by $^{13}$C-NMR, of 74/26. Hereinafter, 1,3-bis(isocyanatomethyl)cyclohexane having a trans-isomer/cis-isomer ratio of 74/26 is referred to as "BIC74".

Synthesis of Polyurethane Elastomer

Polyurethane elastomers having the compositions shown in Table 1 were synthesized as follows. First, polytetramethylene ether glycol (PTMG2000) heated at the temperature of 80° C. was added to bis(isocyanatomethyl)cyclohexane (BIC) heated at the temperature of 80° C. Then, dibutyl tin dilaurate (dibutyl tin dilaurate available from Aldrich, Inc.) of 0.005 mass % of the total amount of the raw materials (BIC, PTMG2000, and BD) was added thereto. Then, the mixture was stirred at the temperature of 80° C. for 2 hours under a nitrogen gas flow. Under a nitrogen gas flow, 1,4-butane diol (BD) heated at the temperature of 80° C. was added to the mixture, and the mixture was stirred at the temperature of 80° C. for 1 minute. Then, the reaction liquid was cooled, and degassed under the reduced pressure for 1 minute at the room temperature. After the degassing, the reaction liquid was spread in a container, kept at the temperature of 110° C. for 6 hours under a nitrogen gas atmosphere to carry out an urethane reaction, thereby obtaining polyurethane elastomers.

TABLE 1

| Polyurethane Elastomer Composition | M.W. | PU86-1 | PU86-2 | PU86-3 | PU77-1 | PU74 |
| --- | --- | --- | --- | --- | --- | --- |
| BIC86 | 194 | 0.98 | 1.13 | 1.41 | — | — |
| BIC77 | 194 | — | — | — | 1.35 | — |
| BIC74 | 194 | — | — | — | — | 1.41 |
| PTMG2000 | 2000 | 0.5 | 0.5 | 0.5 | 0.5 | 0.5 |
| BD | 90 | 0.48 | 0.63 | 0.91 | 0.84 | 0.90 |
| Ratio of Trans isomer (mole %) | — | 86 | 86 | 86 | 77 | 74 |
| Hardness (JIS-A/Shore D) | — | 85/32 | 90/40 | 95/46 | 90/40 | 90/40 |

Formulation: molar ratio,
M.W.: Molecular weight
BIC86: 1,4-bis(isocyanatomethyl)cyclohexane (trans isomer: 86 mole %)
BIC77: 1,4-bis(isocyanatomethyl)cyclohexane (trans isomer: 77 mole %)
BIC74: 1,3-bis(isocyanatomethyl)cyclohexane (trans isomer: 74 mole %)
PTMG2000: Polytetramethyleneetherglycol (number average molecular weight: 2000) available from BASF Japan Co.
BD: 1,4-butane diol available from Tokyo chemical industry Co., Ltd Production of the Golf Ball (1) Preparation of the Spherical Core The core rubber compositions having formulations shown in Table 2 were kneaded and pressed in upper and lower molds, each having a hemispherical cavity, at a temperature of 170° C. for 20 minutes to obtain the spherical cores No. 1 to No. 21.

TABLE 2

| | | Core rubber composition No. | | | | |
| --- | --- | --- | --- | --- | --- | --- |
| | | A | B | C | D | E |
| Rubber composition (parts by mass) | Polybutadiene rubber | 100 | 100 | 100 | 100 | 100 |
| | Zinc acrylate | 36 | 38 | 39 | 36 | 30 |
| | Zinc oxide | 5 | 5 | 5 | 5 | 5 |
| | Barium sulfate | 16.49 | 17.2 | 12.8 | 13.57 | 15.88 |
| | 2-thionaphthol | 0.32 | 0.32 | 0.32 | 0.32 | — |
| | Diphenyl disulfide | — | — | — | — | 0.22 |
| | Stearic acid | 10 | — | — | — | — |
| | Myristic acid | — | 10 | — | — | — |
| | Zinc octanoate | — | — | 5 | — | — |
| | Dicumyl peroxide | 0.8 | 0.8 | 0.8 | 0.8 | 0.8 |
| | Total amount of carboxylic acid/salt | 13.6 | 13.8 | 8.9 | 3.6 | 3.0 |

Polybutadiene rubber: a high-cis polybutadiene BR730 (cis-1,4 bond content = 96 mass %, 1,2-vinyl bond content = 1.3 mass %, Moony viscosity (ML$_{1+4}$ (100° C.) = 55, molecular weight distribution (Mw/Mn) = 3) available from JSR Corporation Zinc acrylate: Sanceler SR (product of 10 mass % stearic acid coating) available from Sanshin Chemical Industry Co., Ltd.

Zinc oxide: "Ginrei R" manufactured by Toho Zinc Co., Ltd.

Barium sulfate: "Barium sulfate BD" manufactured by Sakai Chemical Industry Co., Ltd., adjustment was made such that the finally obtained golf ball had a mass of 45.4 g.

2-thionaphthol: available from Tokyo Chemical Industry Co., Ltd.

Diphenyl disulfide: manufactured by Sumitomo Seika Chemicals Company Limited Stearic acid: available from NOF corporation. (purity of 98% or higher).

Myristic acid: available from Tokyo Chemical Industry Co., Ltd.

Zinc octanoate: available from Mitsuwa Chemicals Co., Ltd. (purity of 99% or higher).

Dicumyl peroxide: "PERCUMYL ® D" available from NOF Corporation.

(2) Molding of Half Shells 100 parts by mass of the polyurethane elastomers shown in Table 3 and 4 were dry blended with 4 parts by mass of titanium oxide, and mixed by a twin-screw kneading extruder to prepare cover compositions in the form of pellet. Extrusion was performed in the following conditions: screw diameter=45 mm; screw revolutions=200 rpm; and screw L/D=35. The mixtures were heated to a temperature ranging from 150° C. to 230° C. at a die position of the extruder. Compression molding of half shells were performed by, charging one pellet of the cover composition obtained as described above into each of depressed parts of lower molds for molding half shells, and applying pressure to mold half shells. Compression molding was performed at a temperature of 170° C. for 5 minutes under a molding pressure of 2.94 MPa.

TABLE 3

| | | Cover composition No. | | | | | | |
|---|---|---|---|---|---|---|---|---|
| | | a | b | c | d | e | f | g |
| Cover composition (parts by mass) | PU86-1 | 100 | — | — | — | — | — | — |
| | PU86-2 | — | 100 | — | 70 | 50 | — | 30 |
| | PU86-3 | — | — | 100 | — | — | — | — |
| | PU77-1 | — | — | — | — | — | 100 | — |
| | PU74 | — | — | — | — | — | — | — |
| | Elastollan ET885 | — | — | — | — | — | — | — |
| | Elastollan 1190ATR | — | — | — | 30 | 50 | — | 70 |
| | Elastollan 1195ATR | — | — | — | — | — | — | — |
| | Elastollan XNY85A | — | — | — | — | — | — | — |
| | Elastollan XNY90A | — | — | — | — | — | — | — |
| | Elastollan XNY95A | — | — | — | — | — | — | — |
| | Titanium oxide | 4 | 4 | 4 | 4 | 4 | 4 | 4 |
| PU composition | Rebound resilience (%) | 67 | 60 | 54 | 58 | 56 | 56 | 52 |
| | Shore D hardness | 32 | 40 | 46 | 40 | 40 | 40 | 40 |
| | JIS-C hardness | 52.6 | 63.2 | 71.1 | 63.2 | 63.2 | 63.2 | 63.2 |
| | Shear loss modulus G'' ($\times 10^6$ Pa) | 0.37 | 1.59 | 4.97 | 1.60 | 5.03 | 5.00 | 4.83 |

TABLE 4

| | | Cover composition No. | | | | | | |
|---|---|---|---|---|---|---|---|---|
| | | h | i | j | k | l | m | n |
| Cover composition (parts by mass) | PU86-1 | — | — | — | — | — | — | — |
| | PU86-2 | — | — | — | — | — | — | — |
| | PU86-3 | — | — | — | — | — | — | — |
| | PU77-1 | — | — | — | — | — | — | — |
| | PU74 | — | — | — | — | — | — | 100 |
| | Elastollan ET885 | 100 | — | — | — | — | — | — |
| | Elastollan 1190ATR | — | 100 | — | — | — | — | — |
| | Elastollan 1195ATR | — | — | 100 | — | — | — | — |
| | Elastollan XNY85A | — | — | — | 100 | — | — | — |
| | Elastollan XNY90A | — | — | — | — | 100 | — | — |
| | Elastollan XNY95A | — | — | — | — | — | 100 | — |
| | Titanium oxide | 4 | 4 | 4 | 4 | 4 | 4 | 4 |
| PU composition | Rebound resilience (%) | 53 | 47 | 41 | 37 | 34 | 32 | 51 |
| | Shore D hardness | 32 | 40 | 46 | 32 | 40 | 46 | 40 |
| | JIS-C hardness | 52.6 | 63.2 | 71.1 | 52.6 | 63.2 | 71.1 | 63.2 |
| | Shear loss modulus G'' ($\times 10^6$ Pa) | 2.07 | 6.00 | 8.33 | 5.97 | 8.23 | 14.0 | 4.85 |

(3) Molding of the Cover

The spherical core obtained in (1) was covered with the two half shells obtained in (2) in a concentric manner, and the cover was molded by compression molding. Compression molding was performed at a temperature of 145° C. for 2 minutes under a molding pressure of 9.8 MPa.

The surface of the obtained golf ball body was subjected to a sandblast treatment, and marking, and then clear paint was applied thereto and dried in an oven at a temperature of 40° C. to obtain golf balls having a diameter of 42.8 mm and a mass of 45.4 g. The obtained golf balls were evaluated, and results thereof are also shown in Tables 5 to 8.

TABLE 5

| | | Golf ball (core) No. | | | | |
|---|---|---|---|---|---|---|
| | | 1 | 2 | 3 | 4 | 5 |
| Core composition No. | | A | B | C | D | E |
| Core diameter (mm) | | 39.2 | 39.2 | 39.2 | 39.2 | 39.2 |
| Core hardness | 0 mm | 58.4 | 57.8 | 55.1 | 55.4 | 65.3 |
| distribution (JIS-C) | 2.5 mm | 64.4 | 62.2 | 60.3 | 68.2 | 69.2 |
| | 5.0 mm | 69.2 | 67.7 | 66.3 | 73.2 | 71.7 |
| | 7.5 mm | 71.7 | 70.1 | 69.1 | 74.2 | 72.7 |
| | 10.0 mm | 73.0 | 70.8 | 70.0 | 74.3 | 72.5 |
| | 12.5 mm | 73.2 | 71.3 | 71.3 | 73.6 | 72.3 |
| | 15 mm | 79.8 | 79.9 | 80.4 | 78.1 | 76.6 |
| | 17.5 mm | 83.9 | 84.1 | 85.2 | 82.1 | 78.7 |
| | 19.6 mm | 87.9 | 88.2 | 89.2 | 87.0 | 84.0 |
| | 20.0 mm | — | — | — | — | — |
| | 20.4 mm | — | — | — | — | — |
| | 20.8 mm | — | — | — | — | — |
| | Surface hardness - center hardness | 29.5 | 30.4 | 34.1 | 31.6 | 18.7 |
| | $R^2$ of approximated curve | 0.96 | 0.95 | 0.96 | 0.83 | 0.88 |
| | Slope of approximated curve | 1.34 | 1.43 | 1.63 | 1.19 | 0.76 |
| Core coefficient of restitution | | 0.789 | 0.789 | 0.790 | 0.793 | 0.794 |
| Core compression deformation amount (mm) | | 3.28 | 3.45 | 3.35 | 3.30 | 3.35 |
| Cover property | Cover composition No. | a | a | a | a | a |
| | Rebound resilience (%) | 67 | 67 | 67 | 67 | 67 |
| | G" (×10$^6$ Pa) | 0.37 | 0.37 | 0.37 | 0.37 | 0.37 |
| | Shore D hardness | 32 | 32 | 32 | 32 | 32 |
| | JIS-C hardness | 52.6 | 52.6 | 52.6 | 52.6 | 52.6 |
| | Thickness (mm) | 1.8 | 1.8 | 1.8 | 1.8 | 1.8 |
| Ball property | Compression deformation amount (mm) | 3.08 | 3.25 | 3.15 | 3.10 | 3.15 |
| | Scuff resistance | E | E | E | E | E |
| | #5 iron spin rate (rpm) | −160 | −180 | −170 | 400 | 300 |
| | #5 iron carry (index) | 101.9 | 101.7 | 101.8 | 101.8 | 101.8 |
| | Approach spin rate (rpm) | 630 | 590 | 600 | 630 | 620 |

TABLE 6

| | | Golf ball (core) No. | | | | |
|---|---|---|---|---|---|---|
| | | 6 | 7 | 8 | 9 | 10 |
| Core composition No. | | A | A | A | A | A |
| Core diameter (mm) | | 40.0 | 40.8 | 41.6 | 39.2 | 39.2 |
| Core hardness | 0 mm | 58.4 | 58.4 | 58.4 | 58.4 | 58.4 |
| distribution (JIS-C) | 2.5 mm | 64.4 | 64.4 | 64.4 | 64.4 | 64.4 |
| | 5.0 mm | 69.2 | 69.2 | 69.2 | 69.2 | 69.2 |
| | 7.5 mm | 71.7 | 71.7 | 71.7 | 71.7 | 71.7 |
| | 10.0 mm | 73.0 | 73.0 | 73.0 | 73.0 | 73.0 |
| | 12.5 mm | 73.2 | 73.2 | 73.2 | 73.2 | 73.2 |
| | 15 mm | 79.8 | 79.8 | 79.8 | 79.8 | 79.8 |
| | 17.5 mm | 83.9 | 83.9 | 83.9 | 83.9 | 83.9 |
| | 19.6 mm | 87.9 | 87.9 | 87.9 | 87.9 | 87.9 |
| | 20.0 mm | 87.9 | — | — | — | — |
| | 20.4 mm | — | 87.9 | — | — | — |
| | 20.8 mm | — | — | 87.9 | — | — |
| | Surface hardness - center hardness | 29.5 | 29.5 | 29.5 | 29.5 | 29.5 |
| | $R^2$ of approximated curve | 0.96 | 0.97 | 0.97 | 0.96 | 0.96 |
| | Slope of approximated curve | 1.33 | 1.34 | 1.33 | 1.34 | 1.34 |
| Core coefficient of restitution | | 0.789 | 0.789 | 0.789 | 0.789 | 0.789 |
| Core compression deformation amount (mm) | | 3.28 | 3.28 | 3.28 | 3.28 | 3.28 |
| Cover property | Cover composition No. | a | a | a | b | c |
| | Rebound resilience (%) | 67 | 67 | 67 | 60 | 54 |
| | G" (×10$^6$ Pa) | 0.37 | 0.37 | 0.37 | 1.59 | 4.97 |
| | Shore D hardness | 32 | 32 | 32 | 40 | 46 |
| | JIS-C hardness | 52.6 | 52.6 | 52.6 | 63.2 | 71.1 |
| | Thickness (mm) | 1.4 | 1.0 | 0.6 | 1.8 | 1.8 |

TABLE 6-continued

|  |  | Golf ball (core) No. | | | | |
| --- | --- | --- | --- | --- | --- | --- |
|  |  | 6 | 7 | 8 | 9 | 10 |
| Ball property | Compression deformation amount (mm) | 3.10 | 3.12 | 3.15 | 2.98 | 2.88 |
|  | Scuff resistance | E | G | G | F | F |
|  | #5 iron spin rate (rpm) | −200 | −300 | −400 | −100 | −50 |
|  | #5 iron carry (index) | 102.1 | 102.3 | 102.5 | 101.2 | 100.8 |
|  | Approach spin rate (rpm) | 610 | 600 | 590 | 430 | 300 |

TABLE 7

|  |  | Golf ball (core) No. | | | | |
| --- | --- | --- | --- | --- | --- | --- |
|  |  | 11 | 12 | 13 | 14 | 15 |
| Core composition No. |  | A | A | A | A | A |
| Core diameter (mm) |  | 39.2 | 39.2 | 39.2 | 39.2 | 39.2 |
| Core hardness | 0 mm | 58.4 | 58.4 | 58.4 | 58.4 | 58.4 |
| distribution (JIS-C) | 2.5 mm | 64.4 | 64.4 | 64.4 | 64.4 | 64.4 |
|  | 5.0 mm | 69.2 | 69.2 | 69.2 | 69.2 | 69.2 |
|  | 7.5 mm | 71.7 | 71.7 | 71.7 | 71.7 | 71.7 |
|  | 10.0 mm | 73.0 | 73.0 | 73.0 | 73.0 | 73.0 |
|  | 12.5 mm | 73.2 | 73.2 | 73.2 | 73.2 | 73.2 |
|  | 15 mm | 79.8 | 79.8 | 79.8 | 79.8 | 79.8 |
|  | 17.5 mm | 83.9 | 83.9 | 83.9 | 83.9 | 83.9 |
|  | 19.6 mm | 87.9 | 87.9 | 87.9 | 87.9 | 87.9 |
|  | 20.0 mm | — | — | — | — | — |
|  | 20.4 mm | — | — | — | — | — |
|  | 20.8 mm | — | — | — | — | — |
|  | Surface hardness - center hardness | 29.5 | 29.5 | 29.5 | 29.5 | 29.5 |
|  | $R^2$ of approximated curve | 0.96 | 0.96 | 0.96 | 0.96 | 0.96 |
|  | Slope of approximated curve | 1.34 | 1.34 | 1.34 | 1.34 | 1.34 |
| Core coefficient of restitution |  | 0.789 | 0.789 | 0.789 | 0.789 | 0.789 |
| Core compression deformation amount (mm) |  | 3.28 | 3.28 | 3.28 | 3.28 | 3.28 |
| Cover property | Cover composition No. | d | e | f | g | h |
|  | Rebound resilience (%) | 58 | 56 | 56 | 52 | 53 |
|  | G" (×$10^6$ Pa) | 1.60 | 5.03 | 5.00 | 4.83 | 2.07 |
|  | Shore D hardness | 40 | 40 | 40 | 40 | 32 |
|  | JIS-C hardness | 63.2 | 63.2 | 63.2 | 63.2 | 52.6 |
|  | Thickness (mm) | 1.8 | 1.8 | 1.8 | 1.8 | 1.8 |
| Ball property | Compression deformation amount (mm) | 2.98 | 2.98 | 2.98 | 2.98 | 3.08 |
|  | Scuff resistance | F | F | F | P | P |
|  | #5 iron spin rate (rpm) | −100 | −100 | −100 | 40 | 150 |
|  | #5 iron carry (index) | 101.0 | 100.9 | 100.9 | 100.7 | 100.7 |
|  | Approach spin rate (rpm) | 430 | 280 | 290 | 250 | 400 |

TABLE 8

|  |  | Golf ball (core) No. | | | | | |
| --- | --- | --- | --- | --- | --- | --- | --- |
|  |  | 16 | 17 | 18 | 19 | 20 | 21 |
| Core composition No. |  | A | A | A | A | A | A |
| Core diameter (mm) |  | 39.2 | 39.2 | 39.2 | 39.2 | 39.2 | 39.2 |
| Core hardness | 0 mm | 58.4 | 58.4 | 58.4 | 58.4 | 58.4 | 58.4 |
| distribution (JIS-C) | 2.5 mm | 64.4 | 64.4 | 64.4 | 64.4 | 64.4 | 64.4 |
|  | 5.0 mm | 69.2 | 69.2 | 69.2 | 69.2 | 69.2 | 69.2 |
|  | 7.5 mm | 71.7 | 71.7 | 71.7 | 71.7 | 71.7 | 71.7 |
|  | 10.0 mm | 73.0 | 73.0 | 73.0 | 73.0 | 73.0 | 73.0 |
|  | 12.5 mm | 73.2 | 73.2 | 73.2 | 73.2 | 73.2 | 73.2 |
|  | 15 mm | 79.8 | 79.8 | 79.8 | 79.8 | 79.8 | 79.8 |
|  | 17.5 mm | 83.9 | 83.9 | 83.9 | 83.9 | 83.9 | 83.9 |
|  | 19.6 mm | 87.9 | 87.9 | 87.9 | 87.9 | 87.9 | 87.9 |
|  | 20.0 mm | — | — | — | — | — | — |
|  | 20.4 mm | — | — | — | — | — | — |
|  | 20.8 mm | — | — | — | — | — | — |
|  | Surface hardness - center hardness | 29.5 | 29.5 | 29.5 | 29.5 | 29.5 | 29.5 |
|  | $R^2$ of approximated curve | 0.96 | 0.96 | 0.96 | 0.96 | 0.96 | 0.96 |
|  | Slope of approximated curve | 1.34 | 1.34 | 1.34 | 1.34 | 1.34 | 1.34 |

TABLE 8-continued

| | | Golf ball (core) No. | | | | | |
|---|---|---|---|---|---|---|---|
| | | 16 | 17 | 18 | 19 | 20 | 21 |
| Core coefficient of restitution | | 0.789 | 0.789 | 0.789 | 0.789 | 0.789 | 0.789 |
| Core compression deformation amount (mm) | | 3.28 | 3.28 | 3.28 | 3.28 | 3.28 | 3.28 |
| Cover property | Cover composition No. | i | j | k | l | m | n |
| | Rebound resilience (%) | 47 | 41 | 37 | 34 | 32 | 51 |
| | G" (×10⁶ Pa) | 6.00 | 8.33 | 5.97 | 8.23 | 14.0 | 4.85 |
| | Shore D hardness | 40 | 46 | 32 | 40 | 46 | 40 |
| | JIS-C hardness | 63.2 | 71.1 | 52.6 | 63.2 | 71.1 | 63.2 |
| | Thickness (mm) | 1.8 | 1.8 | 1.8 | 1.8 | 1.8 | 1.8 |
| Ball property | Compression deformation amount (mm) | 2.98 | 2.88 | 3.08 | 2.98 | 2.88 | 2.98 |
| | Scuff resistance | P | P | G | G | F | F |
| | #5 iron spin rate (rpm) | 60 | 20 | 100 | 50 | 0 | 50 |
| | #5 iron carry (index) | 100.5 | 100.3 | 100.2 | 100.1 | 100.0 | 100.6 |
| | Approach spin rate (rpm) | 200 | 100 | 200 | 100 | 0 | 240 |

Materials in tables 3 to 4:

Elastollan ET885: MDI-polyether type polyurethane elastomer having JIS-A hardness of 85 available from BASF Japan Co.

Elastollan 1190ATR: MDI-polyether type polyurethane elastomer having JIS-A hardness of 90 available from BASF Japan Co.

Elastollan 1195ATR: MDI-polyether type polyurethane elastomer having JIS-A hardness of 95 available from BASF Japan Co.

Elastollan XNY85A: $H_{12}$MDI-polyether type polyurethane elastomer having JIS-A hardness of 85 available from BASF Japan Co.

Elastollan XNY90A: $H_{12}$MDI-polyether type polyurethane elastomer having JIS-A hardness of 90 available from BASF Japan Co.

Elastollan XNY95A: $H_{12}$MDI-polyether type polyurethane elastomer having JIS-A hardness of 95 available from BASF Japan Co.

The golf balls No. 1 to 3, and No. 6 to 13 are the golf balls comprising a spherical core and at least one cover layer covering the spherical core, wherein the cover is formed from a polyurethane composition containing a polyurethane elastomer as a resin component, the polyurethane composition satisfying properties of rebound resilience of 54% or more and a shear loss modulus G" of 5.03×10⁶ Pa or less when measured in a shear mode using a dynamic viscoelasticity measuring apparatus at the conditions of the temperature of 0° C., and the oscillation frequency of 10 Hz, and the spherical core has a hardness distribution that $R^2$ of a linear approximate curve determined by a least-squares method is 0.95 or more, when plotting JIS-C hardness measured at a center, a surface and at intervals of 2.5 mm from the center of the spherical core, versus distances from the center of the spherical core.

The results indicate that the golf balls No. 1 to 3, and No. 6 to 13 have a lower spin rate on middle or long iron shots and show a great flight distance, although the spin rates on approach shots become high.

Figure 2:
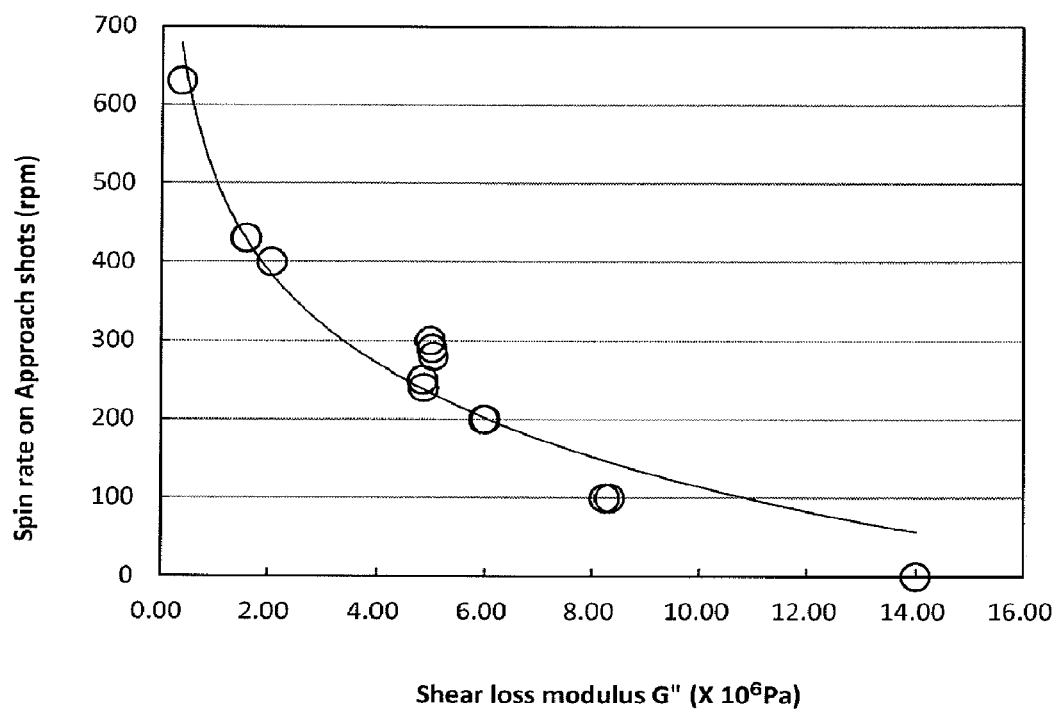
FIG. 2 is a graph showing a correlation between the spin rate on approach shots and the shear loss modulus G"
Figure 3:
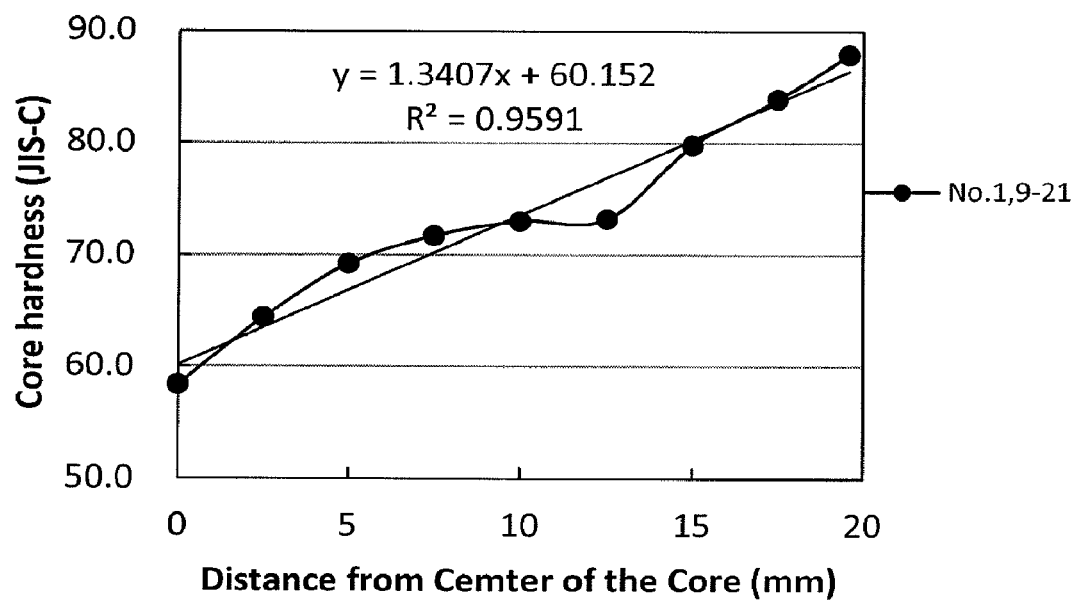
FIG. 3 is a graph showing the hardness distribution of the spherical cores No. 1, No. 9 to No. 21.
Figure 4:
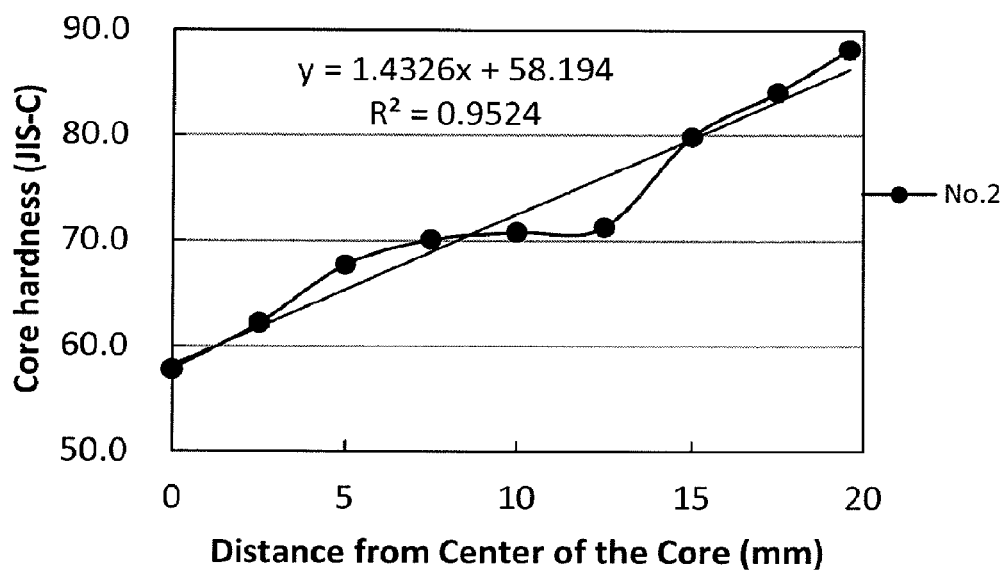
FIG. 4 is a graph showing the hardness distribution of the spherical core No. 2.
Figure 5:
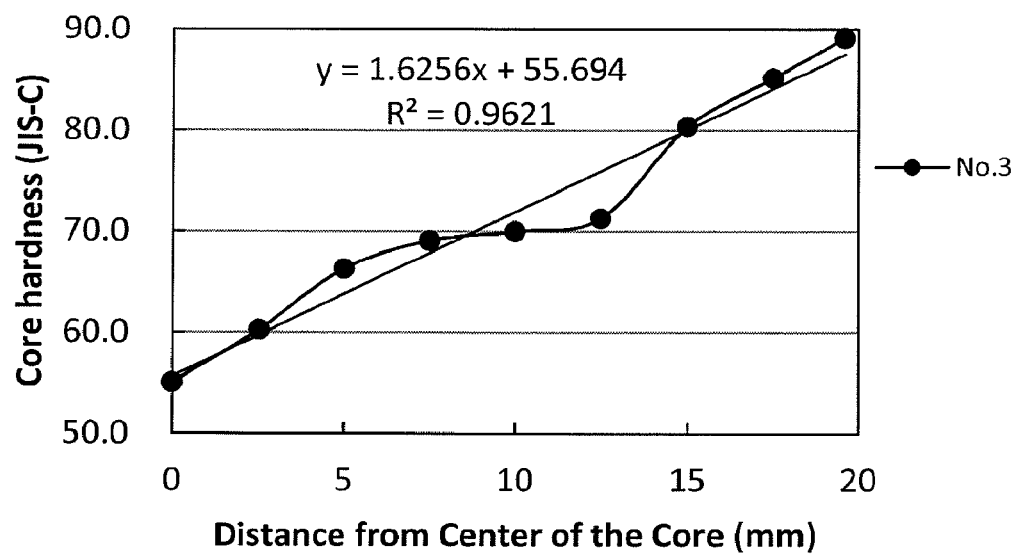
FIG. 5 is a graph showing the hardness distribution of the spherical core No. 3.
Figure 6:
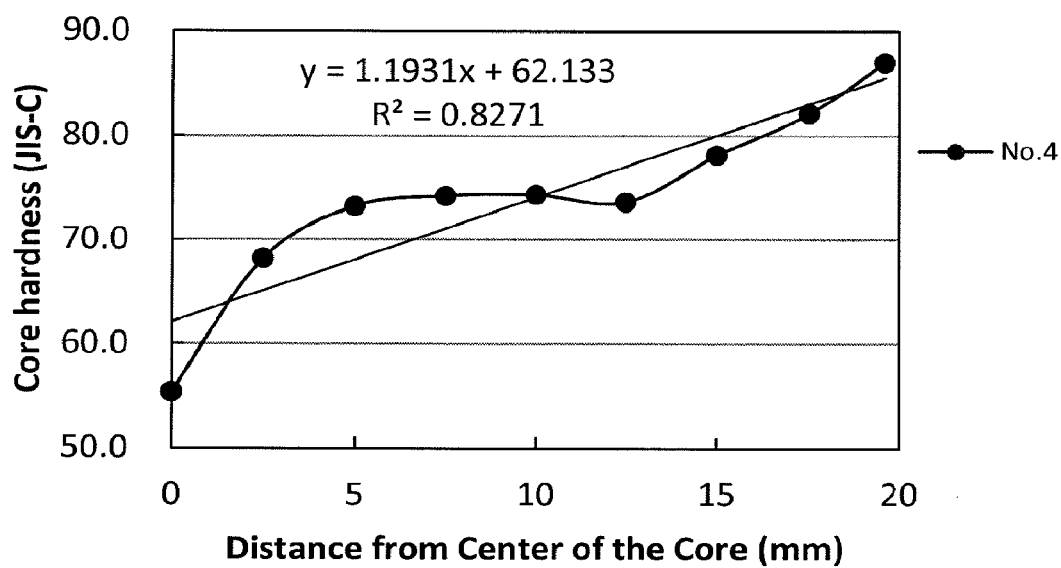
FIG. 6 is a graph showing the hardness distribution of the spherical core No. 4.
Figure 7:
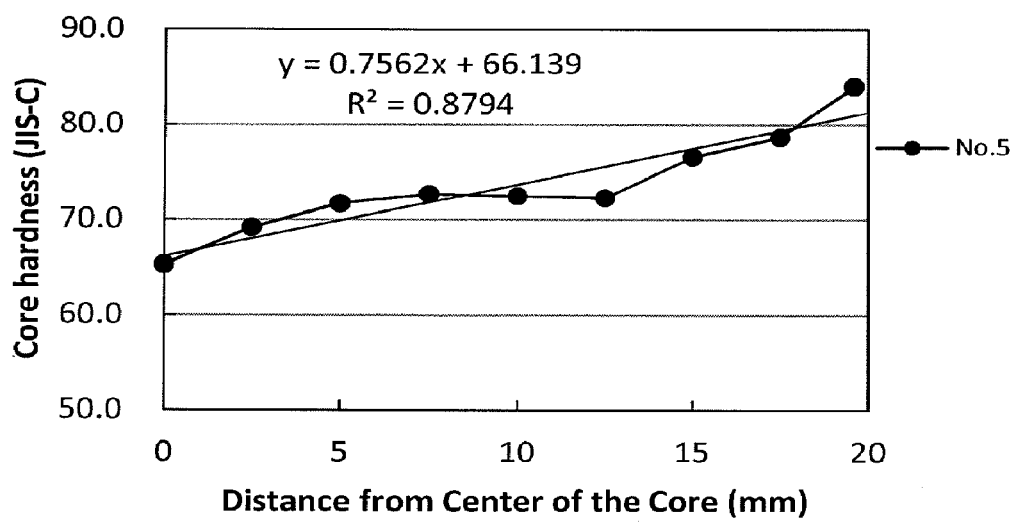
FIG. 7 is a graph showing the hardness distribution of the spherical core No. 5.
Figure 8:
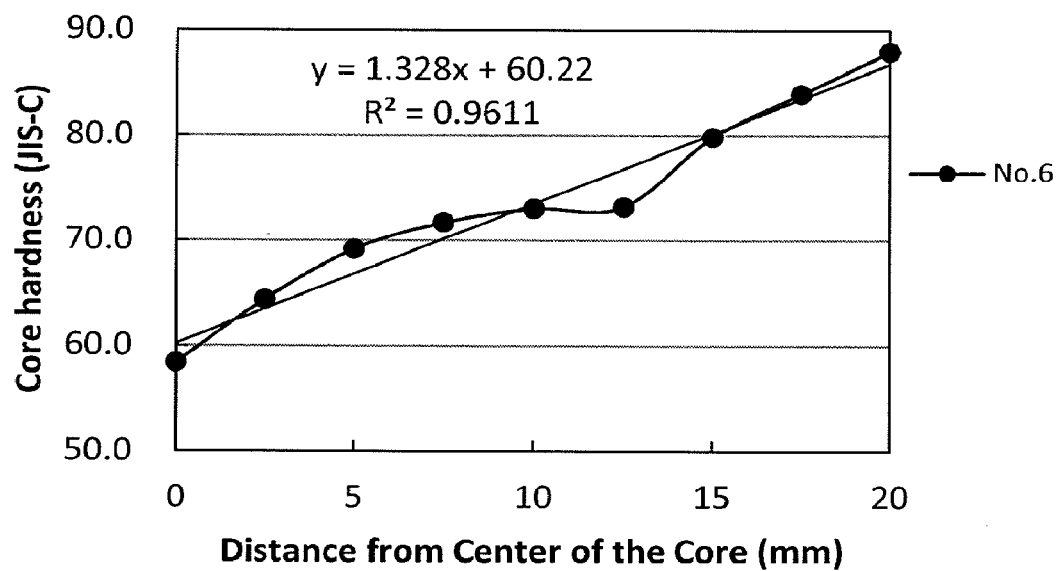
FIG. 8 is a graph showing the hardness distribution of the spherical core No. 6.
Figure 9:
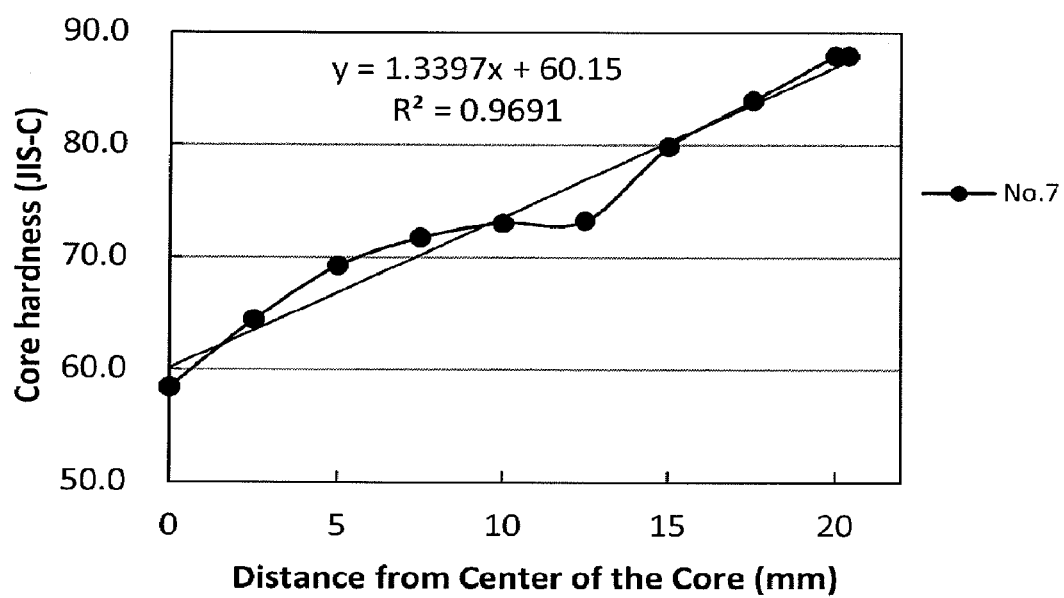
FIG. 9 is a graph showing the hardness distribution of the spherical core No. 7.
Figure 10:
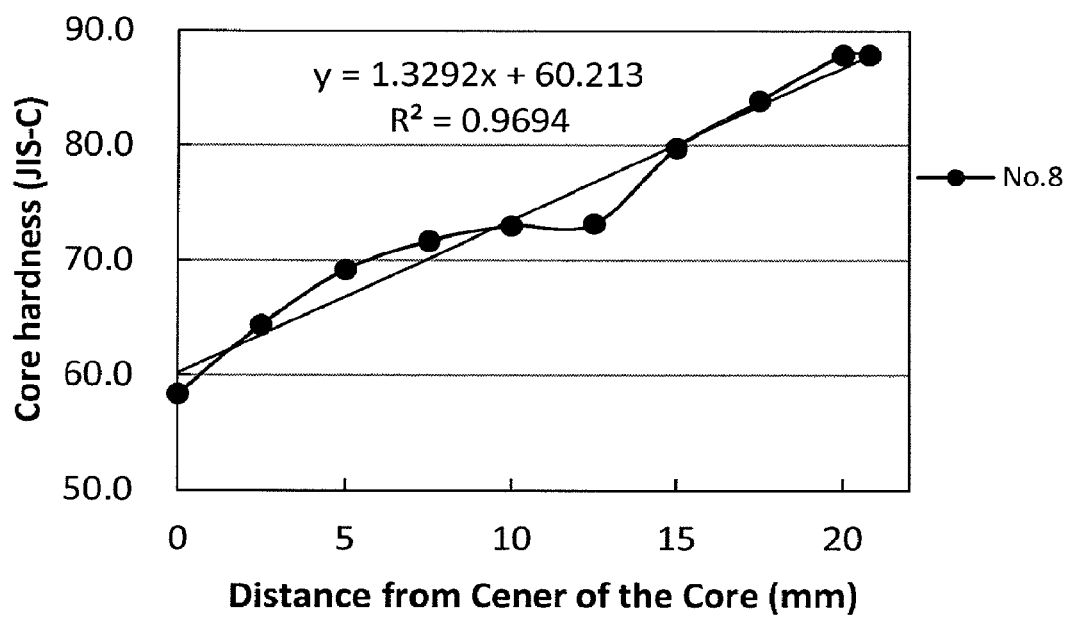
FIG. 10 is a graph showing the hardness distribution of the spherical core No. 8.
Figure 11:
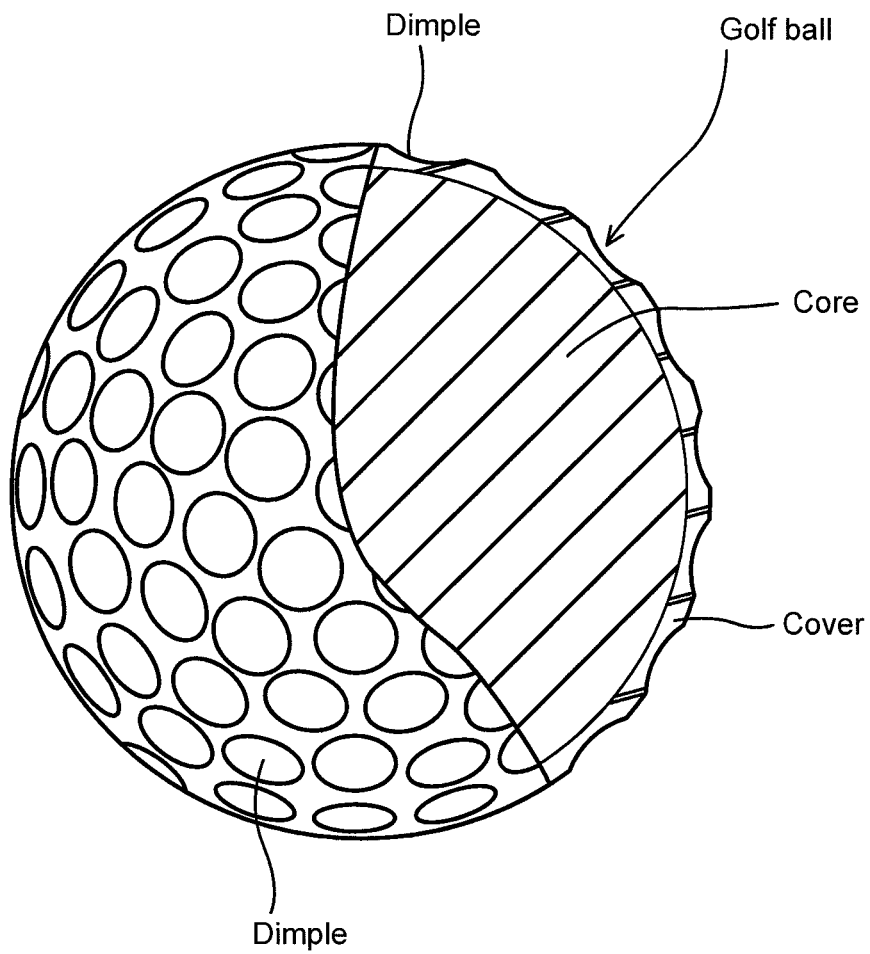
FIG. 11 is a drawing of a golf ball having a spherical core and a cover that covers the core.

FIG. 2 is a graph showing a correlation between the spin rate on approach shots and the shear loss modulus G" with respect to golf balls No. 1, No. 9 to No. 21. As apparent from FIG. 2, it has been confirmed that the spin rate on approach shots increases as the shear loss modulus G" is getting small.

According to the present invention, it is possible to provide a golf ball traveling a great distance on middle or long irons shots while having a high spin rate on approach shots. This application is based on Japanese Patent applications No. 2011-189296 filed on Aug. 31, 2011, the contents of which are hereby incorporated by reference.

What is claimed is:

1. A golf ball comprising a spherical core and at least one cover layer covering the spherical core,
   wherein the cover layer is formed from a polyurethane composition containing as resin component a polyurethane elastomer formed from 1,4-bis(isocyanatomethyl)cyclohexane as a polyisocyanate component,
   wherein the polyurethane composition has a rebound resilience of 54% or more, a slab hardness ranging from 25 to 53 in Shore D hardness, and a shear loss modulus G" of 5.03×10⁶ Pa or less when measured in a shear mode using a dynamic viscoelasticity measuring apparatus under conditions including a temperature of 0° C., and an oscillation frequency of 10 Hz, and
   wherein the spherical core has a hardness distribution that $R^2$ of a linear approximate curve determined by a least-squares method of 0.95 or more, based on a plotting of JIS-C hardness measured at the core center, the core surface and at intervals of 2.5 mm from the core center, versus distance from the center of the spherical core,
   wherein the resin component of the polyurethane composition contains the polyurethane elastomer in a content of 50 mass % or more, and
   wherein the 1,4-bis(isocyanatomethyl)cyclohexane constitutes its trans isomer in an amount of 80 mole % or more.

2. The golf ball according to claim 1, wherein the resin component of the polyurethane composition contains the polyurethane elastomer in a content of 70 mass % or more.

3. The golf ball according to claim 1, wherein the resin component of the polyurethane composition consists of the polyurethane elastomer.

4. The golf ball according to claim 1, wherein the polyurethane composition has a shear loss modulus G" of 1.60×10⁶ Pa or less.

5. The golf ball according to claim 1, wherein the cover layer has a thickness ranging from 0.3 mm to 4.0 mm.

6. The golf ball according to claim 1, wherein the golf ball has a compression deformation amount (shrinking amount in a compression direction) ranging from 2.5 mm to 4.5 mm, when applying a load from 98 N as an initial load to 1275 N as a final load to the golf ball.

7. The golf ball according to claim 1, wherein the spherical core has a hardness difference ranging from 15 to 50 in JIS-C hardness between a surface hardness Hs and a center hardness Ho thereof.

8. The golf ball according to claim 7, wherein the spherical core is formed from a rubber composition containing:
   (a) a base rubber,
   (b) an α,β-unsaturated carboxylic acid having 3 to 8 carbon atoms and/or a metal salt thereof as a co-crosslinking agent,
   (c) a crosslinking initiator,
   (d) a carboxylic acid and/or a salt thereof excluding an α,β-unsaturated carboxylic acid having 3 to 8 carbon atoms or a metal salt thereof, provided that the rubber composition further contains (e) a metal compound if only (b) the α,β-unsaturated carboxylic acid having 3 to 8 carbon atoms is present as the co-crosslinking agent.

9. The golf ball according to claim 8, wherein (d) the carboxylic acid and/or the salt thereof is a fatty acid and/or a fatty acid salt.

10. The golf ball according to claim 8, wherein (d) the carboxylic acid and/or the sale thereof is a carboxylic acid having 4 to 30 carbon atoms and/or a salt thereof.

11. The golf ball according to claim 8, wherein the rubber composition contains (d) the carboxylic acid and/or the salt thereof in a content ranging from 0.5 part by mass to 40 parts by mass with respect to 100 parts by mass of (a) the base rubber.

\* \* \* \* \*